United States Patent
Ferguson

(10) Patent No.: US 12,407,671 B2
(45) Date of Patent: Sep. 2, 2025

(54) SYSTEMS AND METHODS FOR LINKING SECURITY ACCOUNTS TO APPLICATION ACCOUNTS AND CONVERGING MULTIPLE IDENTITY SYSTEMS

(71) Applicant: CVS Pharmacy, Inc., Woonsocket, RI (US)

(72) Inventor: JC Ferguson, Woonsocket, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 135 days.

(21) Appl. No.: 18/523,602

(22) Filed: Nov. 29, 2023

(65) Prior Publication Data

US 2025/0173449 A1 May 29, 2025

(51) Int. Cl.
*H04L 9/40* (2022.01)
(52) U.S. Cl.
CPC .............................. *H04L 63/0815* (2013.01)
(58) Field of Classification Search
CPC ........ G06F 21/31; G06F 21/41; G06F 21/604; G06F 21/6218; H04L 63/08; H04L 63/0815; H04L 63/0853; H04L 63/0876; H04L 63/0884; H04L 63/0892; H04L 63/10–105; H04L 63/20–205
See application file for complete search history.

(56) References Cited

U.S. PATENT DOCUMENTS

| | | | |
|---|---|---|---|
| 7,035,855 B1 | 4/2006 | Kilger et al. | |
| 8,312,033 B1 | 11/2012 | McMillan et al. | |
| 8,589,442 B2 | 11/2013 | Wu et al. | |
| 10,693,865 B2 | 6/2020 | Manza et al. | |
| 2005/0154913 A1 | 7/2005 | Barriga et al. | |
| 2012/0023565 A1* | 1/2012 | Tumanyan | G06F 21/41 726/8 |
| 2019/0068627 A1* | 2/2019 | Thampy | H04L 63/1425 |
| 2020/0067911 A1* | 2/2020 | Ishikawa | H04L 63/0815 |
| 2020/0374278 A1 | 11/2020 | Sundaram et al. | |

\* cited by examiner

*Primary Examiner* — Kevin Bechtel
(74) *Attorney, Agent, or Firm* — Leydig, Voit & Mayer, Ltd.

(57) ABSTRACT

A method is provided. The method comprises: receiving, by a customer identity and access management (CIAM) system and from a user device associated with a first user, a request to access resources for a second application; determining, by the CIAM system and using a relational data structure, a global identifier (ID) associated with the first security account identifier; determining, by the CIAM system and using the relational data structure, one or more additional application identifiers and one or more security account identifiers for the first user based on the global ID; based on providing the one or more additional application identifiers for the first user to a second application back-end system, generating, by the CIAM system, a signed token indicating permissions that the first user is entitled to for the second application; and providing, by the CIAM and to the user device, the signed token.

20 Claims, 16 Drawing Sheets

| Global ID | Application IDs | Security Account ID |
|---|---|---|
| 244 | 55 | 169 |
| 244 | 99 | 555 |
| 244 | 89 | 906 |

| Global ID | Application IDs | Security Account ID |
|---|---|---|
| 244 | 55, 99, 89 | 169 |

SYSTEMS AND METHODS FOR LINKING SECURITY ACCOUNTS TO APPLICATION ACCOUNTS AND CONVERGING MULTIPLE IDENTITY SYSTEMS

BACKGROUND

An organization such as an enterprise organization (e.g., company) may provide multiple different services that are hosted and/or operated on multiple different domains/servers. For example, an enterprise organization may acquire complimentary services through merger and acquisition activities or choose to build new services in isolated organizations. For instance, the enterprise organization may provide a first service such as a pharmacy service (e.g., prescription pick-up service) and a second service such as a grocery service (e.g., a grocery pick-up service). Each service may have its own identity provider for customer authentication, which may store its own user information for a particular individual and its own identifier for the individual. Identity providers may serve the purpose of authenticating and authorizing an individual for access to a specific application and/or service. For example, the pharmacy service's login username and password may enable the individual to perform pharmacy pick-up orders such as picking up a prescription. This may lead to configurations where identity management and application authorization are comingled in the same system out of convenience. In an environment where one identity can be used to access many applications or services, which greatly enhances customer experience with a "single login" for all services, separating identity authentication from application authorization may be desirable, as attempting to comingle identity and multiple application authorization in the same system is not easily scalable. Accordingly, there remains a technical need to separate identity authentication from application authorization.

SUMMARY

In some examples, the present application provides a method and system for linking security accounts to application accounts and converging multiple identity systems. For example, a user device may provide login information such as a username and/or password to an enterprise system such as a customer identity and access management (CIAM) system. The login information may be associated with a first application/service. The CIAM system may include a relational data structure that includes multiple entries for multiple different users. Each entry may be associated with a single user and may comprise one or more application identifiers, a security account identifier for the single user, and a global identifier (ID) assigned to the person associated with the user (e.g., username or account). For instance, the global ID for the particular user may be the same throughout (e.g., the same through multiple entries, because each entry is associated with the same person), but the application identifiers and/or the security account identifiers may be different depending on the application/service. After a successful login, the user device may request a token using an authentication code. The CIAM system may use the authentication code to determine a security account identifier for the user, and then, using the data structure, determine the global ID and/or application identifiers for the user using the security account identifier as a lookup key. The CIAM system may then provide the application identifiers to a back-end system associated with the first application/service, and the back-end system may determine and return claims for the user. The CIAM system may return a signed token with the claims to the user device, which may then use the signed token to access resources associated with the token contents.

Following, the user device may seek to access a second application/service using the first security account's authorization, and provide a request for a token for the second application. The request may indicate the token (or other material/data) from the first application, which may include or indicate the first security account identifier. The CIAM system may decrypt the identifiers from the first application token, and obtain a global ID for the user. Users known to be associated with the same person across multiple disparate security accounts are assigned the same global ID. Using the global ID and the data structure, the CIAM system may determine additional application identifiers and/or security account identifiers for the user. The CIAM system may request user claims from a second application back-end system associated with the second application/service, and the second application back-end system may return the user claims for the second application/service. The CIAM system may then return the signed token with the claims to the user device, which may then use the token to access resources associated with the token contents, based on the first security account's authentication, thus providing the user the capability to use multiple applications with a single identity.

In one aspect, a system is provided. The system comprises: a user device associated with a user, wherein the user device is configured to: in response to providing a first request to access resources for a first application, receive first application information indicating a first security account identifier for the first application; and provide a second request to access resources for a second application, wherein the second request indicates the first security account identifier for the first application. The system further comprises a customer identity and access management (CIAM) system configured to: provide the first application information to the user device; receive the second request to access the resources for the second application from the user device; determine, using a relational data structure, a global identifier (ID) associated with the first security account identifier, wherein the relational data structure comprises a plurality of entries associated with a plurality of users, wherein each of the plurality of entries is associated with a single user and comprises one or more application identifiers, a security account identifier, and a global ID, wherein the global ID is assigned to the user based on demographic information associated with the user; determine, using the relational data structure, one or more additional application identifiers based on the user sharing the same global ID across a plurality of identity providers; in response to providing the one or more additional application identifiers to a second application back-end system, receive, from the second application back-end system, claims indicating permissions that the user is entitled to for the second application; generate a signed token indicating the permissions from the second application back-end system; and provide the signed token to the user device, wherein the user device is further configured to use the signed token to access the resources on the second application back-end system.

Examples may include one of the following features, or any combination thereof. For instance, in some examples, the system further comprises the plurality of identity providers, wherein the user is associated with a plurality of applications that are accessed using the plurality of identity providers, wherein each of the plurality of identity providers assigns the single user a unique security account identifier, and wherein the plurality of applications comprise at least the first application and the second application.

In some variations, the system further comprises: the second application back-end system configured to: generate the one or more additional application identifiers during enrollment of the user for the second application; receive, from the CIAM system, the one or more additional application identifiers; determine the permissions that the user is entitled to for the second application identified based on the received one or more additional application identifiers that was previously generated by the second application back-end system and assigned to the user; provide the claims indicating the permissions that the user is entitled to for the second application; and in response to receiving user device information indicating the signed token, granting access to the resources for the second application to the user device.

In another aspect, a method is provided. The method comprises: receiving, by a customer identity and access management (CIAM) system and from a user device associated with a first user, a request to access resources for a second application, wherein the request indicates a first security account identifier for a first application that was previously provided to the user device; determining, by the CIAM system and using a relational data structure, a global identifier (ID) associated with the first security account identifier, wherein the relational data structure comprises a plurality of entries associated with a plurality of users, and wherein each of the plurality of entries is associated with a single user and comprises one or more application identifiers, a security account identifier, and a global ID; determining, by the CIAM system and using the relational data structure, one or more additional application identifiers and one or more security account identifiers for the first user based on the global ID; based on providing the one or more additional application identifiers for the first user to a second application back-end system, generating, by the CIAM system, a signed token indicating permissions that the first user is entitled to for the second application; and providing, by the CIAM and to the user device, the signed token, wherein the signed token is used by the user device to access the resources associated with the second application back-end system.

Examples may include one of the following features, or any combination thereof. For instance, in some examples, the method further comprises: generating the relational data structure for the plurality of users; and storing the relational data structure in a database.

In some instances, generating the relational data structure comprises: based on a registration request to register the first user with the second application back-end system, receiving, from the second application back-end system, the one or more additional application identifiers for the first user; determining the global ID for the first user; generating a second security account identifier for the first user; and persisting and storing the one or more additional application identifiers, the global ID, and the second security account identifier into the relational data structure.

In some variations, generating the relational data structure comprises: receiving, from a first data extractor associated with a first application back-end system, a first data file comprising a list of users, wherein each user within the list of users is assigned a unique global ID and a unique first application identifier; based on receiving the first data file, generating a plurality of security account identifiers for each of the users in the list of users, wherein the plurality of security account identifiers comprises the first security account identifier; and persisting and storing the application identifier, the global ID, and the security account identifier for each user into the relational data structure.

In some examples, generating the relational data structure further comprises: receiving, from a second data extractor associated with the second application back-end system, a second data file comprising a second list of users, wherein each user within the second list of users is assigned a unique global ID and a unique second application identifier; based on receiving the second data file, generating a plurality of second security account identifiers for each of the users in the second list of users; and persisting and storing the second application identifier, the global ID, and the second security account identifier for each user into the relational data structure.

In some instances, determining, using the relational data structure, the global ID is based on the global ID being persisted with the first security account identifier, and wherein determining, using the relational data structure, the one or more additional application identifiers is based on the one or more additional application identifiers being persisted with the same global ID.

In some variations, the method further comprises: receiving, from the user device, a login request to access resources for the first application, wherein the login request indicates credentials of the first user; and based on validating the credentials of the first user, providing, to the user device, the first security account identifier for the first application, wherein the user device accesses resources for the first application based on the first security account identifier.

In some examples, the method further comprises: receiving, from the user device, a token request to access the resources for the first application, wherein the token request indicates the first security account identifier associated with the first user; determining, using the relational data structure, the global ID and a first application identifier based on the first security account identifier; based on providing the first application identifier to a first application back-end system, generating, by the CIAM system, a first signed token indicating permissions that the first user is entitled to for the first application; and providing, to the user device, the first signed token, wherein the first signed token is used by the user device to access the resources on the first application back-end system.

In some instances, generating the first signed token comprises: providing the first application identifier to the first application back-end system, wherein the first application back-end system generated the first application identifier; receiving, from the first application back-end system, claims indicating the permissions that the first user is entitled to for the first application; and generating the first signed token based on the claims from the first application back-end system.

In some examples, generating the signed token comprises: providing the one or more additional application identifiers to the second application back-end system, wherein the second application back-end system generated the one or more additional application identifiers; receiving, from the second application back-end system, claims indicating the permissions that the first user is entitled to for the second application; and generating the signed token based on the claims from the second application back-end system.

In some variations, the user device uses the signed token to perform application programming interface (API) calls with the second application back-end system, wherein the first user is a first user security account, and wherein the global ID is assigned to a single person and is associated with multiple different user security accounts attached to the same person.

In some instances, the method further comprises: receiving, from the user device, a second request to access resources for a third application, wherein the second request indicates the first security account identifier for the first application; determining, using the relational data structure, the global ID associated with the first security account identifier; determining, using the relational data structure, a third application identifier based on the global ID; based on providing the third application identifier to a third application back-end system, generating a second signed token indicating permissions that the first user is entitled to for the third application; and providing, to the user device, the second signed token, wherein the second signed token is used by the user device to access the resources associated with the third application back-end system.

In some examples, the method further comprises: receiving, from the user device, a merge request for duplicate user accounts, wherein the merge request indicates the global ID; retrieving, using the relational data structure, a plurality of application identifiers and a plurality of security account identifiers associated with the same user sharing the same global ID; providing, to the user device, a prompt indicating whether to merge the plurality of application identifiers and the plurality of security account identifiers; and based on a response from the user device: merging the plurality of security account identifiers into a single security account identifier; and merging the plurality of application identifiers into one or more merged application identifiers.

In some variations, the merge request comprises the first security account identifier or the one or more security account identifiers, and wherein the method further comprises: determining the global ID based on the one or more security account identifiers or the first security account identifier.

In some instances, the request comprises a signed token for the first application, wherein the signed token indicates the first security account identifier for the first application.

In yet another aspect, a method is provided. The method comprises: receiving, by a customer identity and access management (CIAM) system and from a user device associated with a first user, a request to access resources for a second application, wherein the request indicates an identifier associated with a first application that was previously provided to the user device; determining, by the CIAM system, using a relational data structure, and based on the identifier associated with the first application, one or more application identifiers and one or more security account identifiers associated with the first user, wherein the relational data structure comprises a plurality of entries associated with a plurality of users, wherein each of the plurality of entries is associated with a single user and comprises one or more application identifiers, a security account identifier, and a global identifier (ID); based on providing the one or more additional application identifiers associated with the first user to a second application back-end system, generating, by the CIAM system, a signed token indicating permissions that the first user is entitled to for the second application; and providing, by the CIAM and to the user device, the signed token, wherein the signed token is used by the user device to access the resources associated with the second application back-end system.

In some examples, the method further comprises: providing, by the CIAM system, a first signed token to the user device, wherein the first signed token is used by the user device to access resources for the first application and comprises the identifier associated with the first application, and wherein the identifier associated with the first application is the global ID for the first user.

All examples and features mentioned herein may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following:

FIGS. 5A and 5B are exemplary relational data structures for a particular user in accordance with one or more examples of the present application.

FIGS. 9A and 9B show an exemplary event sequence for login and token enrichment using the customer identity and access management system in accordance with one or more examples of the present application.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
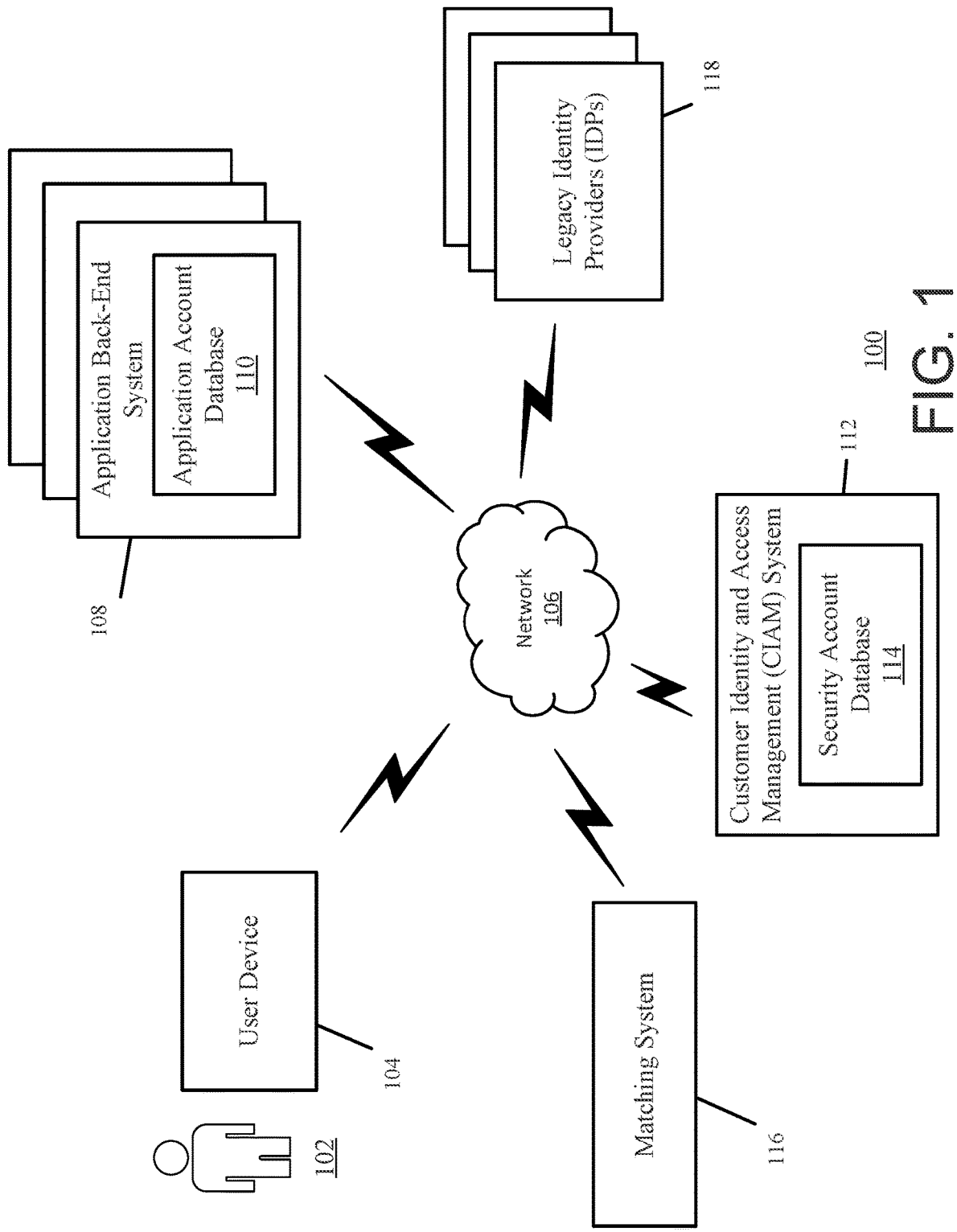
FIG. 1 is a simplified block diagram depicting an exemplary computing environment in accordance with one or more examples of the present application.

Systems, methods, and computer program products are herein disclosed that provide for linking security accounts to application accounts and converging multiple identity systems (e.g., legacy identity providers). FIG. 1 is a simplified block diagram depicting an exemplary environment in accordance with an example of the present application. The environment 100 includes a user 102, a user device 104 (e.g., a computing device), a network 106, one or more application back-end systems 108, a customer identity and access management (CIAM) system 112, a matching system 116, and one or more legacy identity providers (IDPs). The application back-end system 108 includes an application account database 110. The CIAM system 112 includes a security account database 114. Although the entities within environment 100 may be described below and/or depicted in the FIGS. as being singular entities, it will be appreciated that the entities and functionalities discussed herein may be implemented by and/or include one or more entities. For instance, the CIAM system 112 may include a plurality of computing devices, systems, platforms, repositories, and/or servers that are spread across multiple different geographical locations and communicate with each other using direct connections and/or the network 106.

The entities within the environment 100 such as the user device 104 (e.g., a computing device), the one or more application back-end systems 108, the CIAM system 112, the matching system 116, and/or the legacy IDPs 118 may be in communication with other devices and/or systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100.

User 102 may operate, own, and/or otherwise be associated with the user device 104. For instance, the user 102 may be located in a particular location and may use the user device 104 to access content from particular applications and/or services associated with one or more enterprise organizations. The applications may be any type of software application or program that provides one or more services such as web-based applications, mobile applications, web-browser applications, and/or other types of applications or programs that the user 102 may access using the user device 104. For instance, the user 102, using the user device 104, may seek to access content on numerous different applications. Each application may have its own back-end system (e.g., application back-end systems 108) that stores claims, entitlements, and/or permissions for the user. For example, for a first application, the user 102 may be permitted certain entitlements such as being able to access certain content for the application. For instance, based on the user's membership, the user 102 may be entitled to access standard content, but not premium content for the application. For a second application, which may be an insurance application, the user 102 may have his or her own insurance policy that they are entitled to. For a third application, which may provide a prescription/grocery pick-up service, the back-end system may store historical information (e.g., previous purchases and/or prescriptions that the user 102 purchased). Therefore, each application back-end system 108 may be associated with one or more particular applications, and may store claims, entitlements, permissions, and/or other information for the user 102 (e.g., whether the user 102 is entitled to access premium or standard content and/or whether the user 102 has his or her own insurance policy). As will be explained in further detail below, the user device 104 may communicate with the CIAM system 112 to obtain tokens (e.g., JAVASCRIPT Object Notation (JSON) web tokens (JWTs)) indicating the claims, entitlements, and/or permissions for the user 102 for that particular application. The user device 104 may further use the JWTs to access content on the individual back-end systems 108.

The user device 104 is and/or includes, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The user device 104 may be able to execute software applications and/or programs. Additionally, and/or alternatively, the user device 104 may be configured to operate a web browser to connect to a web page and/or applications hosted and/or managed by multiple different back-end systems 108. For instance, the user 102 may use the user device 104 to request access to content on a web page and/or provide user credentials to gain access to the content from the web page (e.g., ordering groceries). In some instances, the user device 104 may be a personal device of the user 102 (e.g., the user device 104 may be a mobile device that is owned by the user 102). In other instances, the user device 104 may be a public device that multiple users may use to access the applications associated with the application back-end systems 108. For instance, the user device 104 may be located at a public location such as at a library. A first and second user may use the user device 104 to access the applications.

The environment 100 may include one or more application back-end systems 108. Each application back-end system 108 is a computing system that hosts, operates, manages, and/or otherwise is associated with one or more applications (e.g., web pages, programs, and/or software applications). Each application back-end system 108 includes an application account database 110 that stores user entitlement and/or other information associated with the hosted/managed application. For instance, the application account database 110 may store user-specific information such as one or more application identifiers associated with the user (e.g., source system keys (SSK), unique identifier (UID), universal unique identifier (UUID), and/or other types of identifiers) as well as the specific user entitlements (e.g., what the user is authorized to do with the application). The application identifiers may be used to identify a user such as the user 102. For instance, the application account database 110 includes application identifiers for each of the users, and the application identifiers may further be associated with claims, entitlements, and/or permissions for the users in the application account database 110. For example, based on an application identifier and the application account database 110, the application back-end system 108 may determine the claims, entitlements, and/or permissions for the users based on what the user is authorized to consume (e.g., user pays for capability A, B, C but not for X, Y, Z).

The application back-end systems 108 include and/or is implemented using one or more computing devices, computing platforms, cloud computing platforms, systems, servers, repositories, databases, and/or other apparatuses capable of hosting and/or managing applications.

In some instances, the application back-end system 108 may be owned, operated, and/or managed by an enterprise organization. The enterprise organization may be any type of corporation, company, organization, and/or other institution that provides one or more goods and/or services. For instance, the enterprise organization may provide multiple different applications and/or services such as a grocery pick-up service, a prescription pick-up service (e.g., the enterprise organization may provide prescriptions/medications to the user 102), an insurance service (e.g., the enterprise organization may provide insurance to the user 102), a streaming service (e.g., the enterprise organization may provide for streaming videos, television shows, and so on to the user 102), and/or other services. Each application back-end system 108 may provide one or more of these services for the enterprise organization or enterprise organizations.

While each of the application back-end systems 108 are shown as separate entities, in some instances, a singular server, computing platform, and/or system may provide multiple applications and/or services for the enterprise organization.

The CIAM system 112 is a computing system that manages multiple identifiers for each of the users. For example, the CIAM system 112 includes a security account database 114 and/or other more additional databases (e.g., a mapping database shown in FIG. 3). The mapping database stores a relational data structure. The relational data structure may include an association and/or linking between the different identifiers for the users such as the application identifiers, the security account identifiers, and/or the global IDs. For example, the CIAM system 112 may create, generate, and/or update the relational data structure such as by persisting and/or linking data/information from the users. As such, the relational data structure may indicate relationships or associations between the different identifiers such as the application identifiers, the security account identifiers, and/or the global IDs. The security account identifier is a unique ID associated with a user in the security account database 114, and is obtained, generated, and/or assigned to the user by the CIAM system 112. An application identifier is a unique ID associated with a user in the application account database 110, which is generated by the application as part of provisioning the user in the application. The global ID is associated with one or more users determined to be the same person by the matching system 116. Because there may be multiple legacy identity systems (e.g., the legacy IDPs 118), in some examples, one person may have two or more security accounts across the legacy IDPs 118 (e.g., the legacy IDPs 118 may generate the security accounts/security account identifiers). In some instances, there may be a 1:1 relationship between the security account identifiers and the application identifiers. In other instances, there may be a 1:n mapping between the security account identifiers and the application identifiers (e.g., a single security account identifier may be associated with multiple different application identifiers). The matching system 116 obtains user data (e.g., demographic data such as address, date-of-birth, etc.) and assigns the same global ID to multiple users based on the matching system 116 determining the users are the same person. In other words, in some examples, a user (e.g., user 102) may be and/or indicate a user account that is associated with a person. The person may have, use, and/or be associated with one or multiple user accounts (e.g., users). As such, the global ID may be assigned to a single person (e.g., an actual human being), but may be associated with numerous users (e.g., multiple different user accounts that are used by the same person).

The legacy IDPs 118 may represent an existing customer identity and access management system that the user 102 would previously use to log into and authenticate to access one or more applications. In some examples, large enterprise organizations may possess several legacy IDPs 118 that are implemented as a result of acquisitions, company structure (e.g., different functional focuses operating independently), and so on. The user 102 thus may have an account in more than one legacy IDPs 118 if the user 102 accesses different applications protected by the different legacy IDPs 118. In this situation, the user 102 may have multiple security accounts with different usernames/passwords, may present different user experiences, may have different requirements for aspects related to a security account (e.g., username must be an email address in one legacy IDP 118 and a string in a second legacy IDP 118; password must be 14 characters in one legacy IDP 118 and password must be 12 characters in another, contain a number and a special character in some legacy IDPs 118, and so on). As described below, the CIAM 112 may seek to migrate the contents and capabilities of two or more legacy IDPs 118, resulting in a single user experience and a single security account for the user 102 to access all applications the user 102 is entitled to use.

Each legacy IDP 118 may include and/or may be implemented using one or more computing devices, computing platforms, cloud computing platforms, systems, servers, repositories, databases, and/or other apparatuses.

In some variations, as mentioned previously, each application back-end system 108 may include information indicating application identifiers for the users (e.g., an application identifier for the user 102) that identifiers the users and/or the permissions, claims, and/or entitlements for the users. The CIAM system 112 may use security identifiers to identify the users, and the global IDs may be an identifier that specifically identifies one or a plurality of users determined to be the same person. The CIAM system 112 may generate a relational data structure that includes numerous entries. Each entry may indicate a global ID, a security identifier, and/or one or more application identifiers. For example, a user such as the user 102 may be associated with a single global ID, but may be associated with multiple different security identifiers and/or application identifiers. For instance, the user may be associated with multiple, different security identifiers based on the user having two or more accounts in two or more legacy IDPs 118. The application back-end systems 108 may only "know" the user based on the application identifiers (e.g., the application back-end systems 108 may only store the application identifiers for the user, but not the security identifiers and/or global ID for the user). Based on the relational data structure, the CIAM system 112 may obtain the relationships or associations between the identifiers associated with the user. For example, based on a security identifier (e.g., a first security identifier) for the user, the CIAM system 112 may obtain the global ID, the other security identifiers, and/or the application identifiers associated with the user 102. In some instances, the CIAM system 112 may use the global ID in the case when two or more security accounts are determined to be the same person by the matching system 116.

For instance, the CIAM system 112 may assist and/or facilitate single sign-on (SSO) for the user 102. For example, the application back-end systems 108 may have an overlap of customers (e.g., a single user 102 may have accounts for numerous services such as an account for the prescription service, an account for an insurance service, an account for a grocery service, and so on). As mentioned above, each application back-end system 108 may be associated with one or more particular applications, and may have one or more application identifiers for each user (e.g., customer). The CIAM system 112 may use the relational data structure, including the global IDs and/or the security account identifiers, to identify the particular application identifiers that are known by the application back-end systems 108 (e.g., stored within the application account database 110). As such, the mapping database (e.g., the mapping database 310 of FIG. 3) may store the relational data structure, and the CIAM system 112 may identify the application identifiers for the particular applications based on the global IDs and/or the security account identifiers. This will be explained in further detail below.

The CIAM system 112 includes and/or is implemented using one or more computing devices, computing platforms, cloud computing platforms, systems, servers, repositories, databases, and/or other apparatuses.

The matching system 116 maintains the global IDs for the users (e.g., the user 102). For example, based on demographic information (e.g., name, address, and/or demographic) of the user and/or other information, the matching system 116 uses one or more processes, algorithms, and/or logic to determine if multiple users in the matching system are "attached" to the same person. If two or more users are determined to be the same person, all matching users are assigned the same global ID; if two or more users are determined to not be "attached" to the same person, each user is assigned a unique global ID. The matching system 116 may provide near real-time updates of the global ID assignments back to the CIAM system 112 and/or other entities in environment 100 and/or may provide the same via an application programming interface (API).

The matching system 116 includes and/or is implemented using one or more computing devices, computing platforms, cloud computing platforms, systems, servers, repositories, databases, and/or other apparatuses.

In some instances, the CIAM system 112 and/or other entities within the environment 100 may be implemented as engines, software functions, and/or applications. In other words, the functionalities of the CIAM system 112 and/or other entities may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. For example, in some variations, the functionalities of the CIAM system 112 may be separated into multiple different entities.

Figure 2:
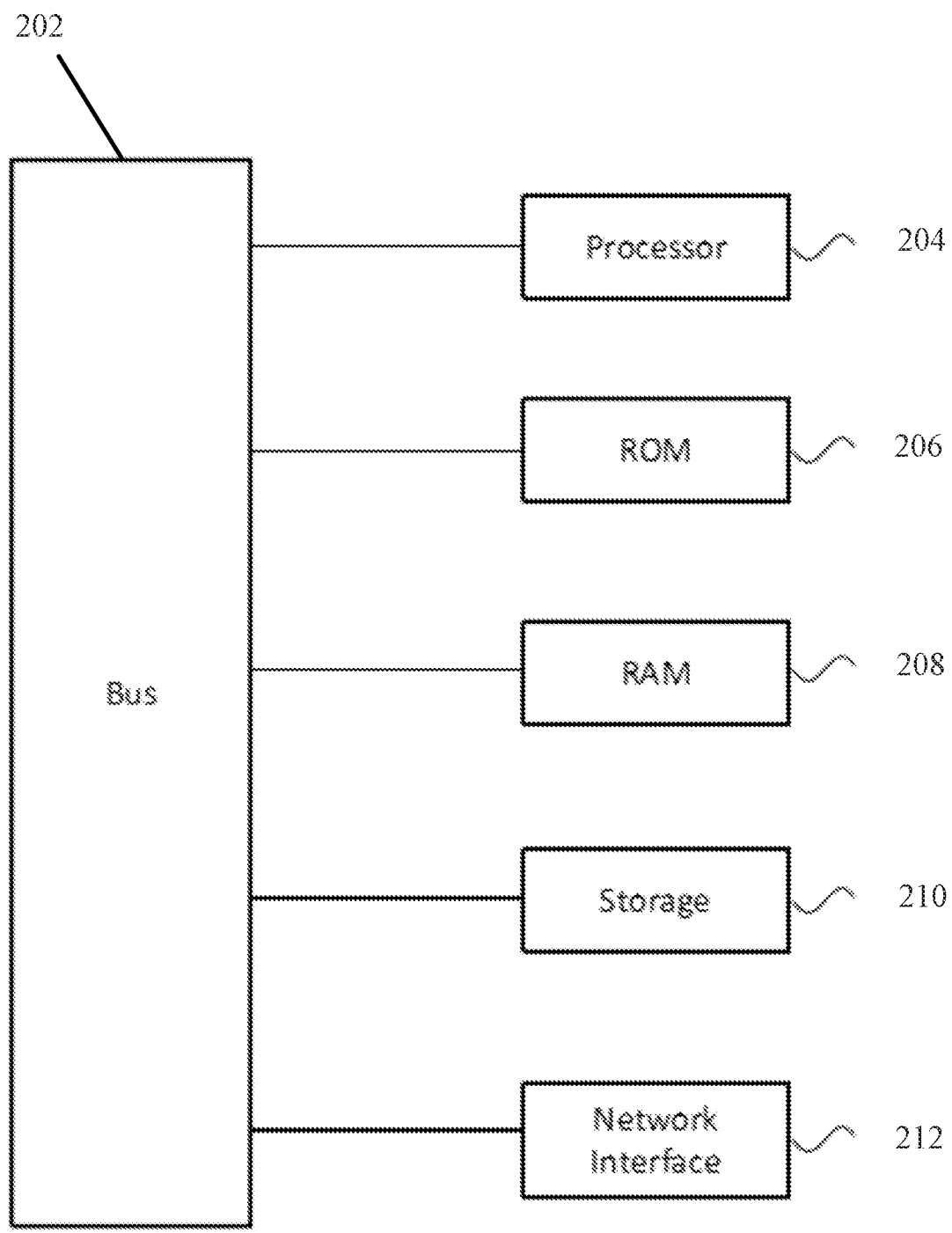
FIG. 2 is a simplified block diagram of one or more devices or systems within the exemplary environment of FIG. 1.

FIG. 2 is a block diagram of an exemplary system and/or device 200 (e.g., the user device 104, the application back-end system 108, the CIAM system 112, and/or the matching system 116) within the environment 100. The device/system 200 includes one or more processors 204, such as one or more CPUs, controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. Additionally, and/or alternatively, the device/system 200 may further include components that might not be included within every entity of environment 100.

Figure 3:
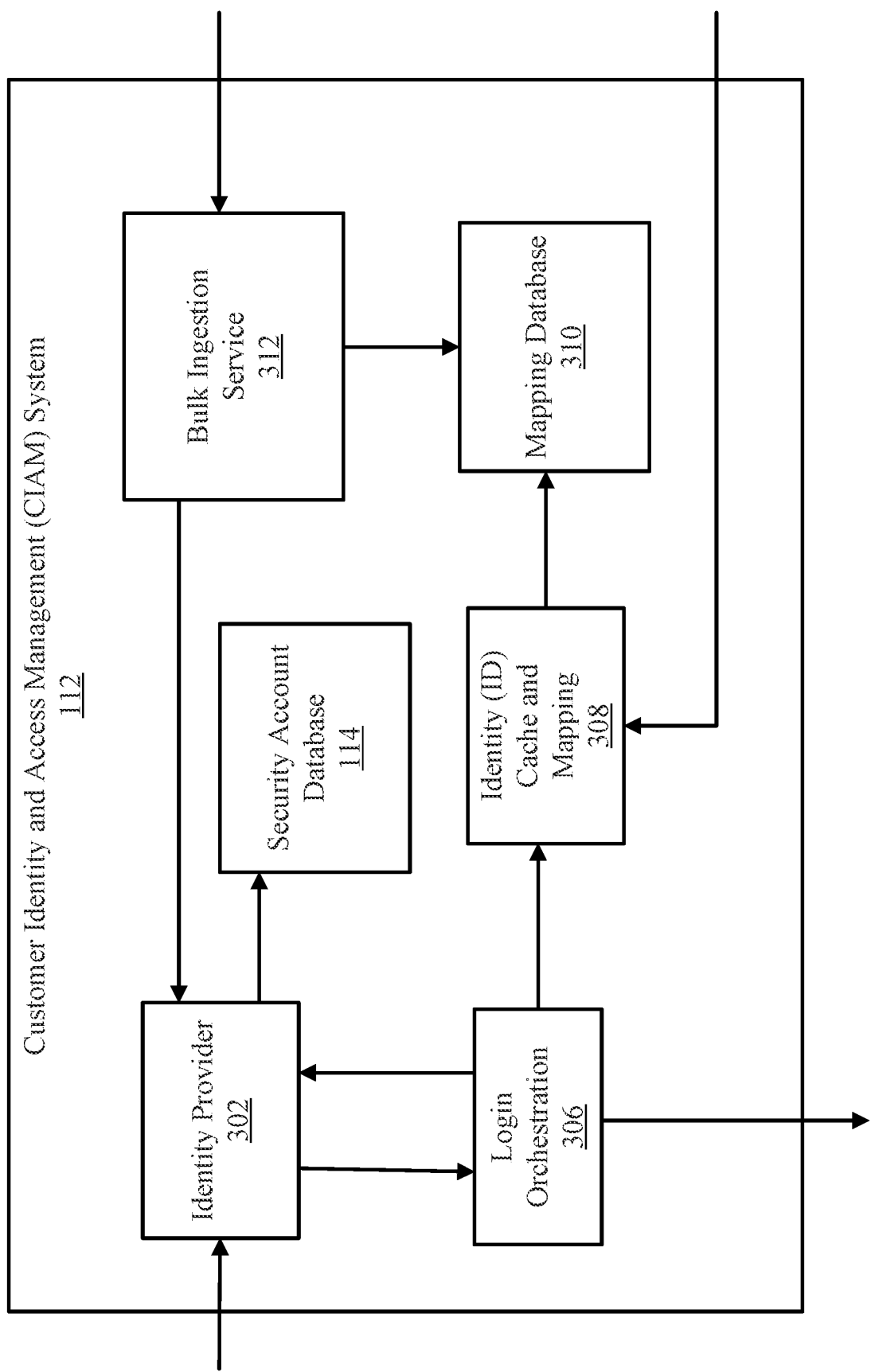
FIG. 3 is a simplified block diagram depicting an exemplary customer identity and access management system in accordance with one or more examples of the present application.

FIG. 3 is a simplified block diagram depicting an exemplary customer identity and access management system (CIAM) in accordance with one or more examples of the present application. The CIAM system 112 shown in FIG. 3 may be the CIAM system 112 that is shown in FIG. 1, and shows further entities and data flow for the CIAM system 112. The CIAM system 112 includes the identity provider 302, the security account database 114, the login orchestration 306, the identity (ID) cache and mapping 308, the bulk ingestion service 312, and/or the mapping database 310. Each of the entities within the CIAM system 112 (e.g., the identity provider 302, the security account database 114, the login orchestration 306, the identity (ID) cache and mapping 308, the bulk ingestion service 312, and/or the mapping database 310) may include and/or be implemented using one or more computing devices, computing platforms, cloud computing platforms, systems, servers, repositories, databases, and/or other apparatuses). Additionally, and/or alternatively, one or more of the entities within the CIAM system 112 may be implemented as engines, software functions, and/or applications. In other words, the functionalities of one or more entities within the CIAM system 112 may be implemented as software instructions stored in storage (e.g., memory) and executed by one or more processors.

In operation, the user 102, using the user device 104, may provide login information such as a username and/or password. The login information is provided to the CIAM system 112 such as the identity provider 302. The identity provider 302 uses data from the security account database 114 to look-up and/or adjudicate the provided information. For example, the identity provider 302 determines a security account identifier (e.g., a first security account identifier) associated with the user 102 (e.g., based on the login information). The security account identifier may be associated with a particular application and/or one or more particular applications, which is determined by using the security account identifier as a key to look up the application identifiers in the mapping database 310 via the ID mapping and caching service 308. The identity provider 302 determines the security account identifier associated with the authenticated user using the security account database 114, and provides the security account identifier back to the user device 104 and/or a reference to the security account identifier through a session identifier to the user device 104. This is the authentication process.

When a user device 104 requests authorization for an application, the user device 104 may provide a token request that requests a token to be used for authorizing access to the first application. The identity provider 302 may receive the token request and forward the token request to the login orchestration 306 with the security account identifier associated with the authenticated user. The login orchestration 306 may retrieve an application identifier associated with the token request. For instance, the token request may indicate the previously determined security account identifier and an associated application that the user 102 is requesting access to. The login orchestration 306 may provide information associated with the token request (e.g., information indicating the security account identifier) to the ID cache and mapping 308. Based on the security account identifier, the ID cache and mapping 308 may use the mapping database 310, which stores a relational data structure, to determine (e.g., retrieve) a global ID for the user 102 and/or one or more application identifiers. For example, the security account identifier may be associated with a first application. The ID cache and mapping 308 may use the security account identifier to determine an associated global ID for the user 102 and/or an application identifier for the user 102 (e.g., an application identifier for the first application). As mentioned previously, the global ID may be an identifier that is specific to the user 102. Additionally, and/or alternatively, based on the retrieved global ID, the ID cache and mapping 308 may determine other security account identifiers and/or other application identifiers associated with the user 102 (e.g., entries sharing the same global ID).

The ID cache and mapping 308 may provide the global ID, the other security account identifiers, and/or one or more application identifiers to the login orchestration 306. Afterwards, the login orchestration 306 may provide information to the application back-end systems 108 such as the determined application identifiers associated with the user 102. For instance, initially, the user 102 may seek to access content for a first application associated with a first security identifier in the security account database 114. Based on the first security identifier, the login orchestration 306 may obtain a first application identifier for the first application. The login orchestration 306 may use the first application identifier to obtain claims, permissions, and/or entitlements for the user 102 for the first application from the first application backend system 108. For instance, the login orchestration 306 may provide information indicating the first application identifier to a first application back-end system 108 that manages and/or hosts the first application. Using the application account database 110 and the first application identifier, the first application back-end system 108 may determine the claims, permissions, and/or entitlements for the user 102 and provide it back to the login orchestration 306. The CIAM system 112 (e.g., the login orchestration 306) may generate and return a plurality of signed tokens (e.g., a signed JWT) with the claims, permissions, and/or entitlements to the user device 104. The user device 104 may use the signed JWT to access allowed content for the first application.

In some examples, the user device 104 may use the CIAM system 112 for SSO. For example, after accessing the content for the first application, the user device 104 may seek to access content for a second application that is different from the first application. The second application may be hosted and/or managed by an application back-end system (e.g., a second application back-end system) that is different from the first application back-end system. The second application may use an independent legacy identity provider (e.g., a second legacy IDP 118) for authentication and access for the second application for the user 102, which has been migrated to the CIAM system 112. The second application back-end system may further include an application account database 110 that knows the user 102 by a different application identifier. For instance, the application account database may store information indicating the user 102 and the different application identifier (e.g., a second application identifier) for the user 102.

Therefore, for the second application, the user device 104 may provide information to the identity provider 302 such as by providing a token request for the second application. The token request may indicate and/or include the first token (e.g., the signed JWT) from the first application and/or other information. For instance, the first token may include and/or indicate a set of identifiers such as the first security account identifier and/or the first application identifier. The security account database 114 might not have information that associates the first security account identifier and/or the first application identifier with identifiers for the second application (e.g., the security account identifiers and/or the application identifiers for the second application). As such, the identity provider 302 may provide information (e.g., the first security account identifier and/or the first application identifier) to the login orchestration 306. The login orchestration 306 may use the ID cache and mapping 308 and the mapping database 310 to determine the additional security account identifiers and/or the additional application identifiers for the user 102, including the application identifier (e.g., the second application identifier) for the second application. For example, the mapping database 310 includes entries indicating relationships between the global ID, the security account identifiers, and the application identifiers. Based on the first application identifier and/or the first security account identifier, the ID cache and mapping 308 may determine a global ID for the user 102 using the mapping database 310. Then, based on the global ID for the user 102, the ID cache and mapping 308 may determine additional entries associated with the user 102 (e.g., additional entries with the same global ID representing the same user migrated to the CIAM system 112 from a plurality of legacy identity providers 118), and these additional entries may indicate additional security account identifiers and/or additional application identifiers. The ID cache and mapping 308 may provide the additional security account identifiers and/or additional application identifiers to the login orchestration 306. The login orchestration 306 may determine the second application identifier from the information provided by the ID cache and mapping 308. Then, the login orchestration 306 may communicate with the second application back-end system 108 that "knows" the user 102 by the second application identifier. Using the second application identifier, the second application back-end system 108 may determine claims, permissions, and/or entitlements for the user 102 for the second application. The second application back-end system 108 may provide this information to the CIAM system 112, and the CIAM system 112 (e.g., the login orchestration 306) may generate a second set of a plurality of signed tokens (e.g., a second JWT) for the second application. The CIAM system 112 may provide the second signed token to the user device 104, and the user device 104 may access content managed and/or hosted by the second application back-end system 108 using the second signed token.

As such, for the second application, the CIAM system 112 may generate a signed token that allows the user 102 to access content for the second application without necessarily having to authenticate to the second legacy identity provider 118, and may generate the signed token using information associated with the first application (e.g., a first signed token that was used to access content for the first application). For instance, the CIAM system 112 may generate the plurality of second signed tokens for the second application by using information from the first application (e.g., the signed tokens for the first application, the first application identifier for the first application, and/or the first security identifier for the first application). This process may be repeated for any number of different applications and/or application back-end systems (e.g., a third application, a fourth application, and so on).

Therefore, in some examples, the CIAM system 112 is able to perform SSO by allowing the user 102 and the user device 104 access to different applications without having to modify and/or change information within the application back-end systems 108. For instance, each application back-end systems 108 may store its own application identifier for the user 102, but might not store other identifies such as the global ID and/or the security account identifiers. The CIAM system 112 may facilitate the SSO by determining the application identifiers for the user 102 based on other identifiers associated with a different application. For example, based on the first security account identifier associated with a first application, the CIAM system 112 may determine the global ID, a second security account identifier associated with a second application, and a second application identifier for the second application. The CIAM system 112 may provide the second application identifier for the second application to the second application back-end system, and the second application back-end system may determine claims, permissions, and/or entitlements for the user 102 using the second application identifier. The CIAM system 112 may generate a second token for the user 102 based on the determined claims, permissions, and/or entitlements for the user 102, and the user device 104 may use the second token to access token for the second application.

By using one or more examples described herein, and among other benefits, the present disclosure may allow decoupling of the security accounts from the applications, which allows applications to manage entitlements separately for the application users from the security account. In other words, authentication (e.g., proving user 102's identity) is separated from authorization (e.g., level of access user 102 has within applications) and the linkage joining these two otherwise disparate accounts is the achieved through the processes described herein. Advantages may further include enabling massive scaling in the implementation, by distributing the application entitlement obligations across a large set of applications, versus centrally attempting to manage it. Further advantages include controlling the security envelope of a token to a single application, versus all applications with a "mega token" entitling the user to all the applications. In other words, a personalized token per application may be used. In addition, another advantage may include allowing for enterprise organizations to ingest applications when acquiring them from other enterprise organizations more easily, due to the clean boundary between security accounts and application accounts, and may thus provide a faster way of providing the user 102 with an SSO experience across newly-acquired applications. Furthermore, similar to the previous advantage, for large enterprises with multiple legacy IDPs where each user may have a plurality of login accounts, it may allow for a faster path to SSO for pre-existing applications. Using the ID relationships previously described, this may enable an enterprise organization with multiple legacy IDPs the benefit of offering users a merge workflow (e.g., manual and/or automated), that is, identifying a plurality of user accounts associated with the same person, and merging all like accounts into a single account, greatly improving user experience. Additionally, and/or alternatively, ID mapping and caching service 308 and mapping database 310 may provide the benefit of tying data outside of authentication and authorization to specific users across disparate applications and identity providers, for example, page clicks in disparate applications may be tied to the same person and used for marketing and/or promotional business activities.

Additionally, and/or alternatively, the CIAM system 112 may provide additional functions such as bulk ingestion service, account creation service, and/or merge service. For example, using the bulk ingestion service 312, the CIAM system 112 may take a list of users from an existing legacy IDP 118 associated with an application, create a security account in CIAM 112, create entries for the users in the mapping database 310 using the security identifier from CIAM 112 and any associated application identifiers to enable merge account workflows and SSO across applications. For account creation service, using the ID cache mapping 308, the CIAM system 112 may create an account for the user, and store entries associated with the user in the mapping database 310. Further, for the merge service, the CIAM system 112 may merge entries associated with the same person in the mapping database 310. These will be described in further detail below.

Figure 4:
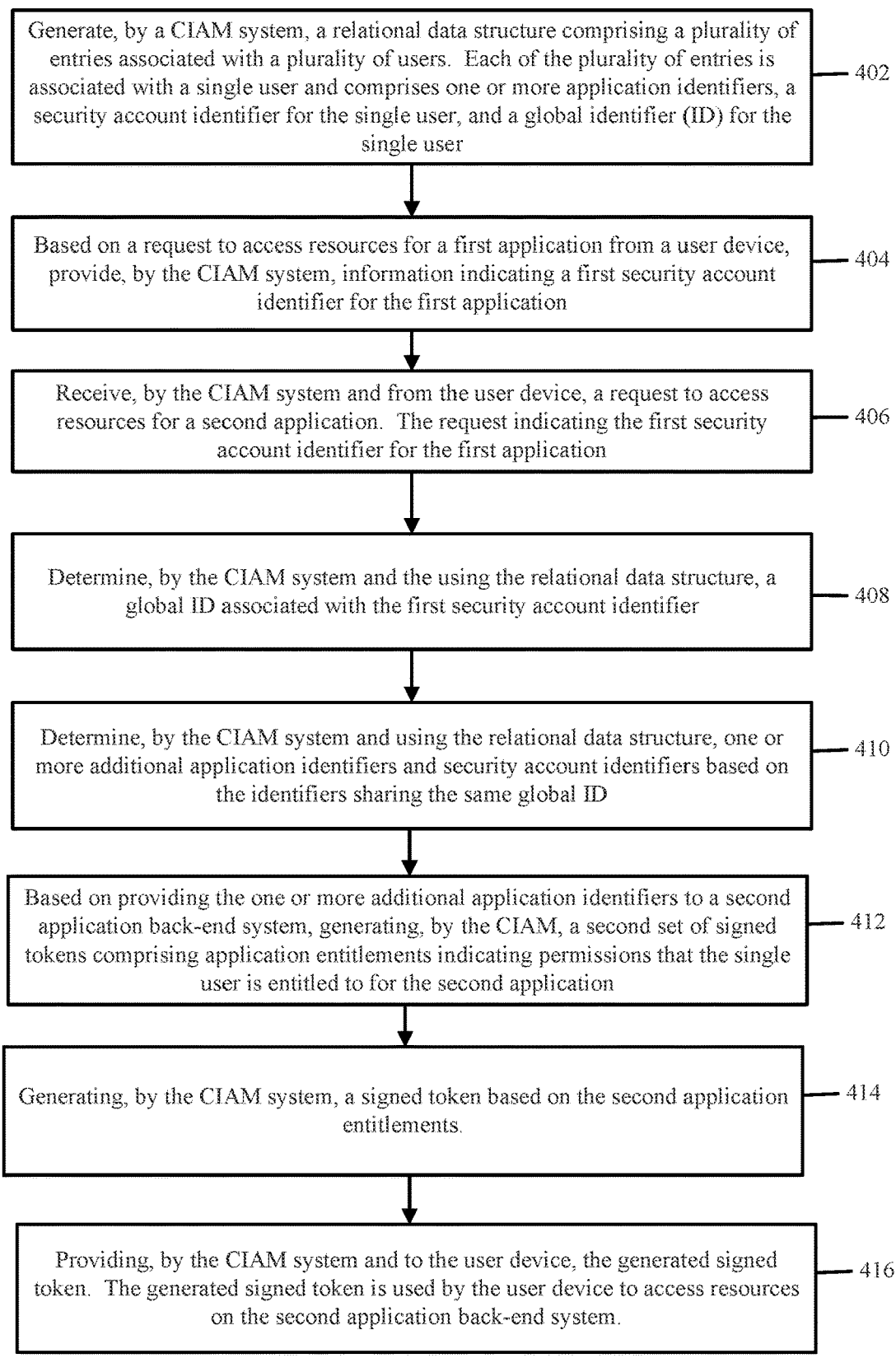
FIG. 4 is an exemplary process for linking security accounts to application accounts and converging multiple disparate identity systems in accordance with one or more examples of the present application.

FIG. 4 is an exemplary process 400 for linking security accounts to application accounts and converging multiple disparate identity systems in accordance with one or more examples of the present application. The process 400 may be performed by the CIAM system 112 of environment 100 shown in FIGS. 1 and 3. It will be recognized that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for linking security accounts to application accounts and converging multiple identity systems. Process 400 will be described based on the relational data structures 500, 550 of FIGS. 5A and 5B as well as the event sequences 600-1100 of FIGS. 6A-11. However, it will be recognized that the relational data structures 500, 550 and the event sequences 600-1100 are merely examples, and other relational data structures and event sequences may be used by the process 400 and/or the CIAM system 112. In addition, the event sequences 600-1100 are merely examples and other types of event sequences are contemplated herein including by performing any of the following blocks in any suitable order.

At block 402, the CIAM system 112 generates a relational data structure comprising a plurality of entries associated with a plurality of users. Each of the plurality of entries is associated with a single user's security account and comprises one or more application identifiers, a security account identifier for the single user, and a global ID for the single user. FIGS. 5A and 5B show relational data structures 500, 550. For example, referring to FIG. 5A, the relational data structure 500 shows three entries 508, 510, 512 for three different security accounts migrated into the CIAM system 112 from three different legacy IDPs 118 (e.g., a first IDP, a second IDP, and a third IDP), which are associated with the same person (e.g., 3 instances of user 102 belong to the same person) because the global ID "244" is the same for all 3 rows. The relational data structure 500 includes columns for the global ID 502, the application IDs 504, and the security account IDs 506. Each entry is associated with a row of the relational data structure 500 (e.g., rows 508, 510, and 512). The user 102 is associated with a single global ID, "244", that is shown in each of the three entries, again indicating the 3 accounts that are associated with the same person. In other words, if the users were not determined to be the same person, the global ID would be different for each row/user whereas in relational data structure 500 shows the global IDs being the same, which indicates it is for the same person. Each of the application IDs and security account IDs for the user 102 is different. For instance, the first entry has a global ID of "244", but application ID of "55" and security account ID of "169". The second entry has the same global ID of "244", but different application ID of "99" and security account ID of "555". The three different security account IDs may be obtained by the CIAM 112 from the different legacy IDPs 118.

Referring to FIG. 5B, the relational data structure 550 includes a singular entry for the user 102 in a merged state based on FIG. 5A. The singular entry includes the same global ID "244" as shown in FIG. 5A, three application IDs of "55", "99", and "89" associated with the user 102, and a security account ID of "169", which is the surviving security account in CIAM 112. In some examples, and as will be explained below in context of FIG. 11, the CIAM system 112 may perform a merging service to merge the entries for the user 102. For instance, based on using the merging service, the CIAM system 112 may merge the three entries from the relational data structure 500 into a singular entry shown in the relational data structure 550.

The relational data structures 500 and 550 are merely exemplary. For instance, while the entries for a single user 102 is shown in the relational data structures 500 and 550, the mapping database 310 may include a relational data structure for numerous different users. Each of the different users may be associated with one or more entries, a global ID, one or more application IDs, and/or one or more security account IDs. The example in FIG. 5A and FIG. 5B shows the pre-merge and merged relational data structure for a user account attached to the same person across a plurality of legacy IDPs 118. In some examples, this is not required. For example, in some instances, one or more additional entitled applications may be added to the relational data structure for a user without being associated with a security account in a legacy IDP 118 by simply adding a $4^{th}$ application ID assigned to the user 102, Returning back to block 402, the CIAM system 112 may generate (e.g., create and/or update) the relational data structure. In some instances, the CIAM system 112 may create a new relational data structure. In other instances, the CIAM system 112 may update a previous relational data structure that is stored in the mapping database 310 based on identifier changes occurring outside the CIAM 112 system, by consuming identifier change events from external systems mastering the identifier(s).

For example, the CIAM system 112 may perform a bulk ingestion service (e.g., using the bulk ingestion service 312) to generate (e.g., create and/or update) the relational data structure and/or account creation service to generate (e.g., create and/or update) the relational data structure. For instance, the bulk ingestion service takes a list of users from an existing legacy IDP 118 and an existing application. The bulk ingestion service may then create new security accounts in CIAM 112 and create new entries in the relational data structure for the list of users. The account creation service creates an account for the user 102 such as when the user 102 (e.g., a customer) seeks to access content for one or more applications. The bulk ingestion service and the account creation service are described in event sequences 600-800.

Figure 6A:
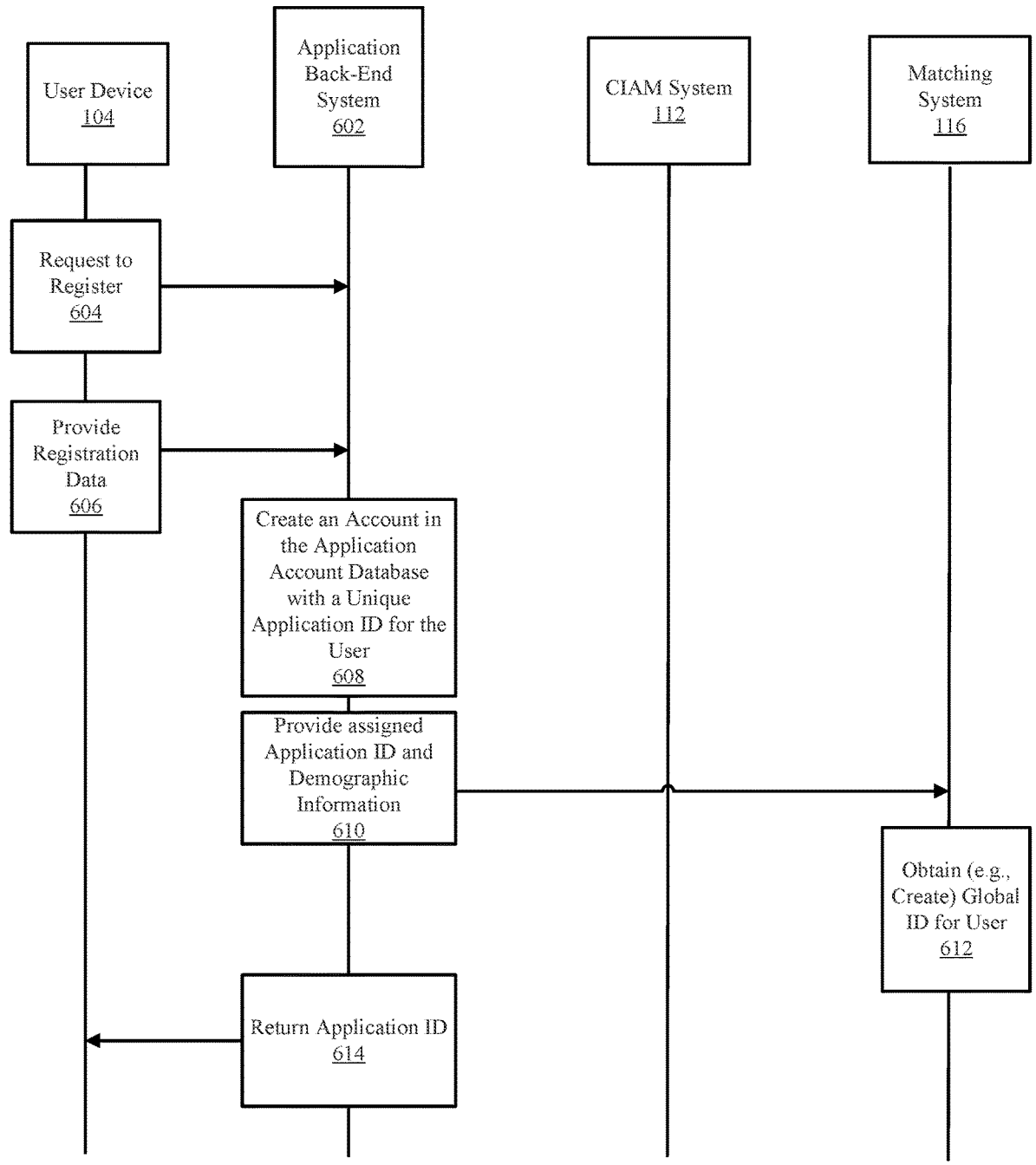
FIGS. 6A and 6B show an exemplary event sequence for generating the relational data structures in accordance with one or more examples of the present application.
Figure 6B:
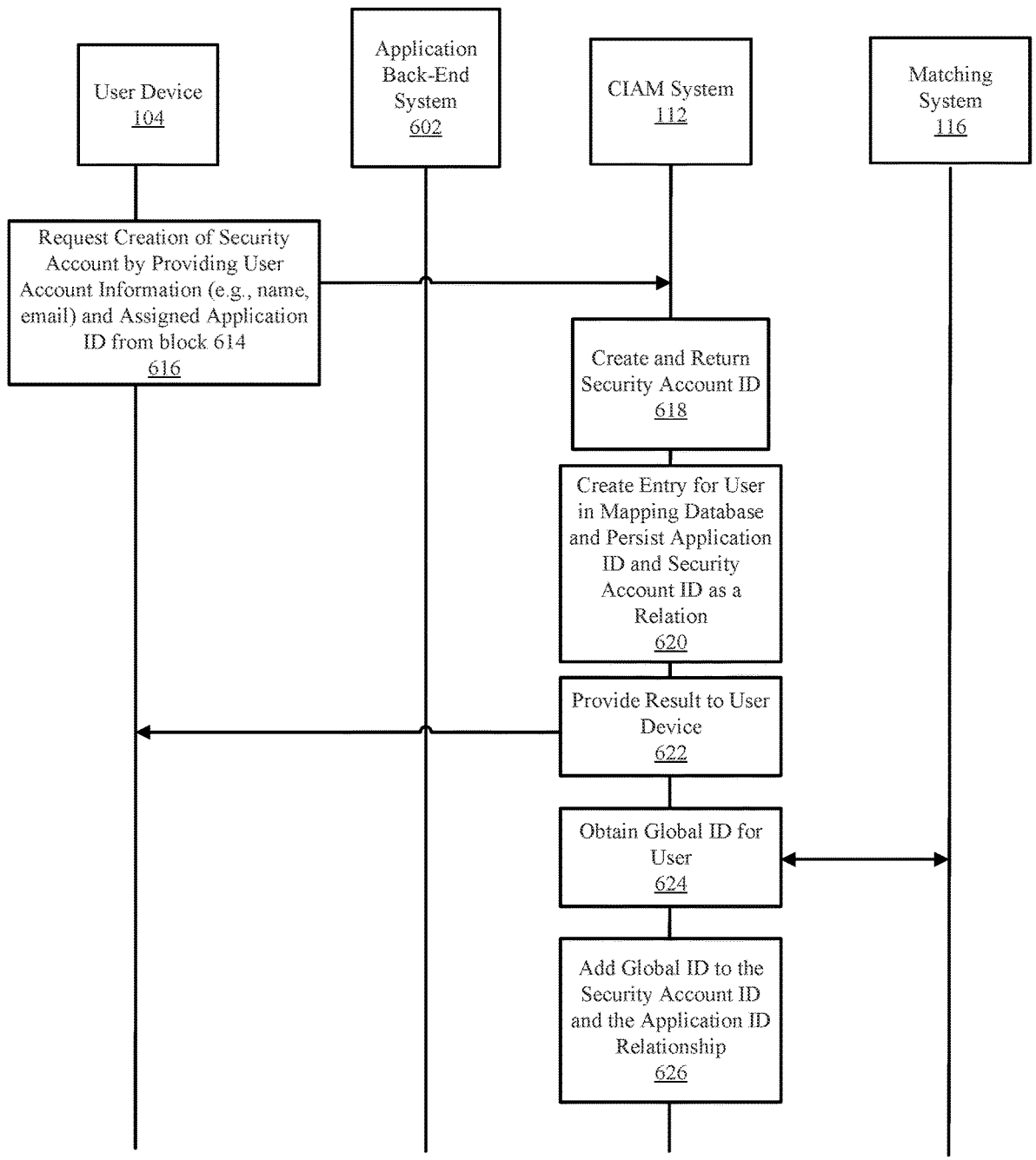

For example, FIGS. 6A and 6B show an exemplary event sequence 600 for generating the relational data structures using the account creation service. The event sequence 600 includes processes, functions, blocks and/or steps performed by the user device 104, an application back-end system 602 (e.g., one of the application back-end systems 108 from FIG. 1), the CIAM system 112, and the matching system 116.

In operation, at block 604, the user device 104 provides a request to register the user 102 to the application back-end system 602. At block 606, the user device 104 provides registration data for registering the user 102 to the application back-end system 602. For instance, the user 102 may seek to register themselves for a particular application (e.g., a first application) associated with the application back-end system 602. For example, the application back-end system 602 may be and/or provide a particular type of service such as an insurance service. To register the user 102, the application back-end system 602 may perform an eligibility check to determine whether the user 102 is allowed to use the product (e.g., service) provided by the application back-end system 602. After the eligibility check is complete, the user device 104 may provide registration data for the user 102 including, but not limited to, user demographic information (e.g., name, rank, address, serial number, and so on) and/or other information associated with the user 102.

At block 608, the application back-end system 602 creates an account in the application account database (e.g., the application account database 110) with a unique application identifier (ID) for the user 102. For instance, as mentioned previously, each application back-end system may know the user 102 by a different and unique application identifier. For instance, referring to FIG. 5A, the user 102 may have a first application ID, "55", for a first application, a second application ID, "99", for a second application, and a third application ID, "89", for a third application. During the enrollment process, the application back-end systems 108 (e.g., the application back-end system 602) may generate a unique application ID for the user 102, and store the unique application ID in the application account database 110. Further, the application back-end systems 108 may include and/or associate the unique application ID for the user 102 with one or more claims, entitlements, and/or permissions that the user 102 is authorized for the application. For instance, the application back-end system 602 may indicate a particular insurance policy associated with the user 102 and the unique application ID or whether the user 102 is a premium member or a standard member.

At block 610, the application back-end system 602 provides the assigned application ID and demographic information to the matching system 116. For instance, the application back-end system 602 may provide demographic information such as address, demographic, name, and/or other information associated with the user 102.

At block 612, the matching system 116 obtains (e.g., creates and/or determines) a global ID for the user 102. For instance, the matching system 116 may determine whether the demographic information and/or a portion of the demographic information (e.g., name and/or address of the user 102) matches with previously stored demographic information for a user. For instance, the matching system 116 may include and/or be associated with a database that stores global IDs and demographic information associated with the users. Based on the received demographic information for the user 102 (e.g., comparing the received demographic information with the stored demographic information), the matching system 116 may determine if the new user's information matches an existing user's information, in which case the matching system assigns the same global ID to the existing user and the new user. If the new user does not match an existing user, the matching system 116 creates a new global ID and assigns it to the new user 102.

At block 614, the application back-end system 602 returns the application identifier to the user device 104. For example, after generating the application identifier, the application back-end system 602 provides the generated application identifier to the user device 104.

Referring to FIG. 6B, at block 616, the user device 104 provides a request to the CIAM system 112 for creation of the security account by providing user account information (e.g., name and/or email) and the assigned application ID from block 614. For example, the user device 104 may seek to create a security account identifier in the CIAM system 112. The request may indicate user account information and the unique application identifier that was generated by the application back-end system 602.

At block 618, the CIAM system 112 creates and returns a security account ID. For example, based on the unique application identifier and the account information, the CIAM system 112 may generate the security account ID. Further, the CIAM system 112 may store the generated security account ID, and/or the account information into the security account database 114.

At block 620, the CIAM system 112 creates an entry for user 102 in mapping database 310 and persists the application ID and the security account ID as a relation. In other words, the CIAM system 112 may link the security account to the application account for the same user 102. For example, the CIAM system 112 may create an entry for the user 102 in the mapping database 310 to be used for requesting application authorization for user 102. For instance, referring to FIG. 6B, at block 620, the CIAM system 112 may create an entry for the user 102 and persist the application ID and the security account ID. For example, the application back-end system 602 may be associated with a third application. The relational data structure 500 may already include the first two entries for the user 102, and at block 620, the CIAM system 112 creates the third entry for the user 102. Initially, the CIAM system 112 populates the application ID that was generated by the application back-end system 602, "89", and the security account ID that was generated by the CIAM system 112 at block 618, "906". The CIAM system 112 may persist these such that they are part of the same entry. At this block, the global ID is currently blank.

At block 622, the CIAM system 112 provides a result to the user device 104. For instance, the CIAM system 112 provides a result indicating that the creation of the security account for the user account information has been created. As mentioned previously, the event sequence 600 is merely exemplary, and other methods and/or event sequences may be used to implement the flow with the same and/or similar outcomes.

At block 624, the CIAM system 112 obtains a global ID for the user 102 from the matching system 116 in an asynchronous manner. For instance, based on the user account information (e.g., the demographic information), the CIAM system 112 received events from the matching system 116, and the events may be used to determine the global ID for the user 102. For example, at block 612, the matching system 116 obtains (e.g., creates and/or determines) the global ID for the user 102. Based on the creation of the global ID or the determination that the global ID for the user 102 was already present, at block 624, the CIAM system 112 obtains (e.g., retrieves) the global ID for the user 102 from the matching system 116.

At block 626, the CIAM system 112 adds the global ID to the security account ID and the application ID relationship. For example, referring to FIG. 5A, after obtaining the global ID for the user 102, the CIAM system 112 may populate the third entry for the user 102 with the global ID, "244". As such, the third entry for the relational data structure for the third application has a global ID, "244", which matches the global ID for the first and second applications, an application ID of "89" from the application back-end system 602, and a security account ID "906" from block 608.

Figure 7:
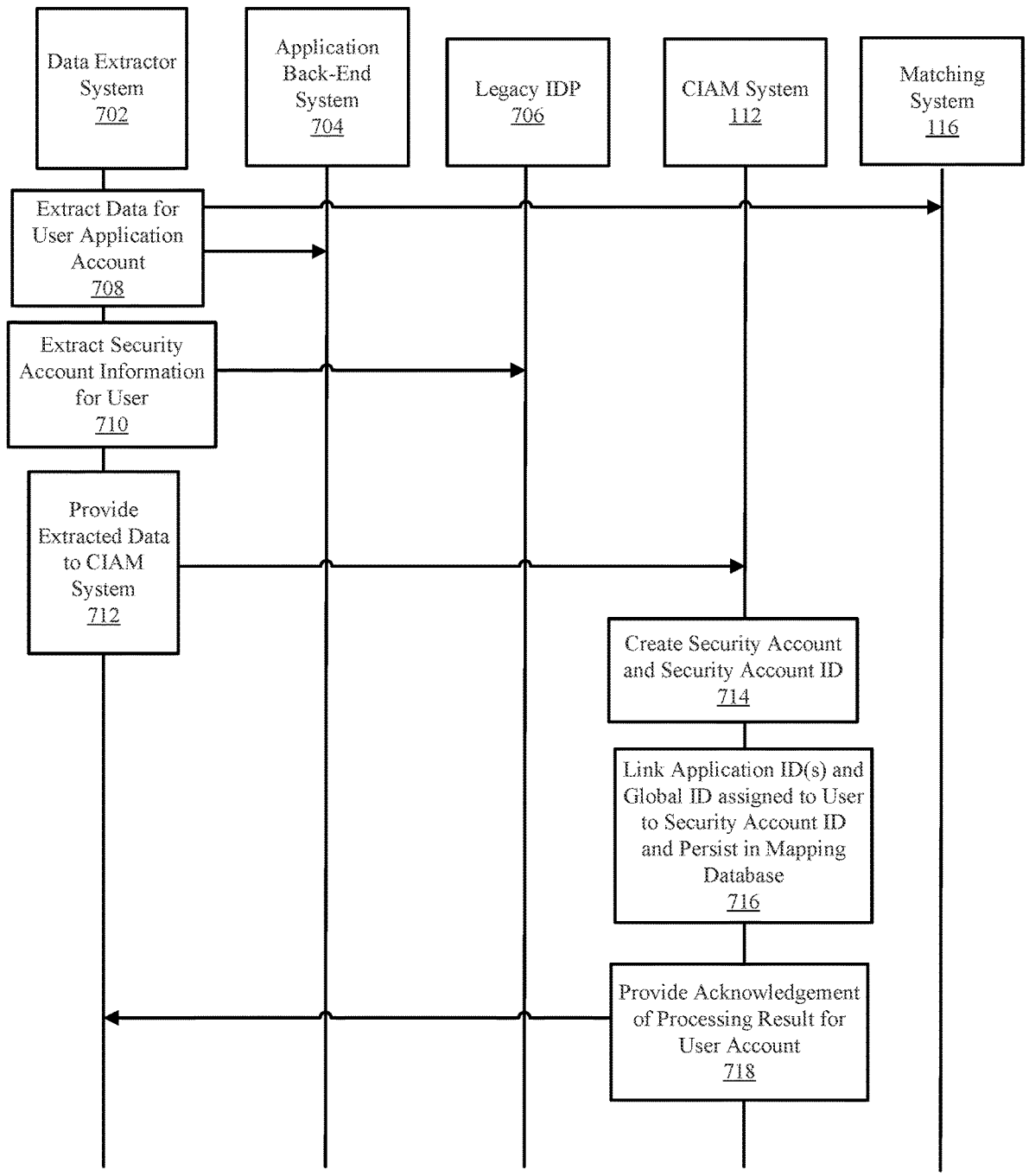
FIG. 7 shows another exemplary event sequence for generating the relational data structures in accordance with one or more examples of the present application.
Figure 8A:
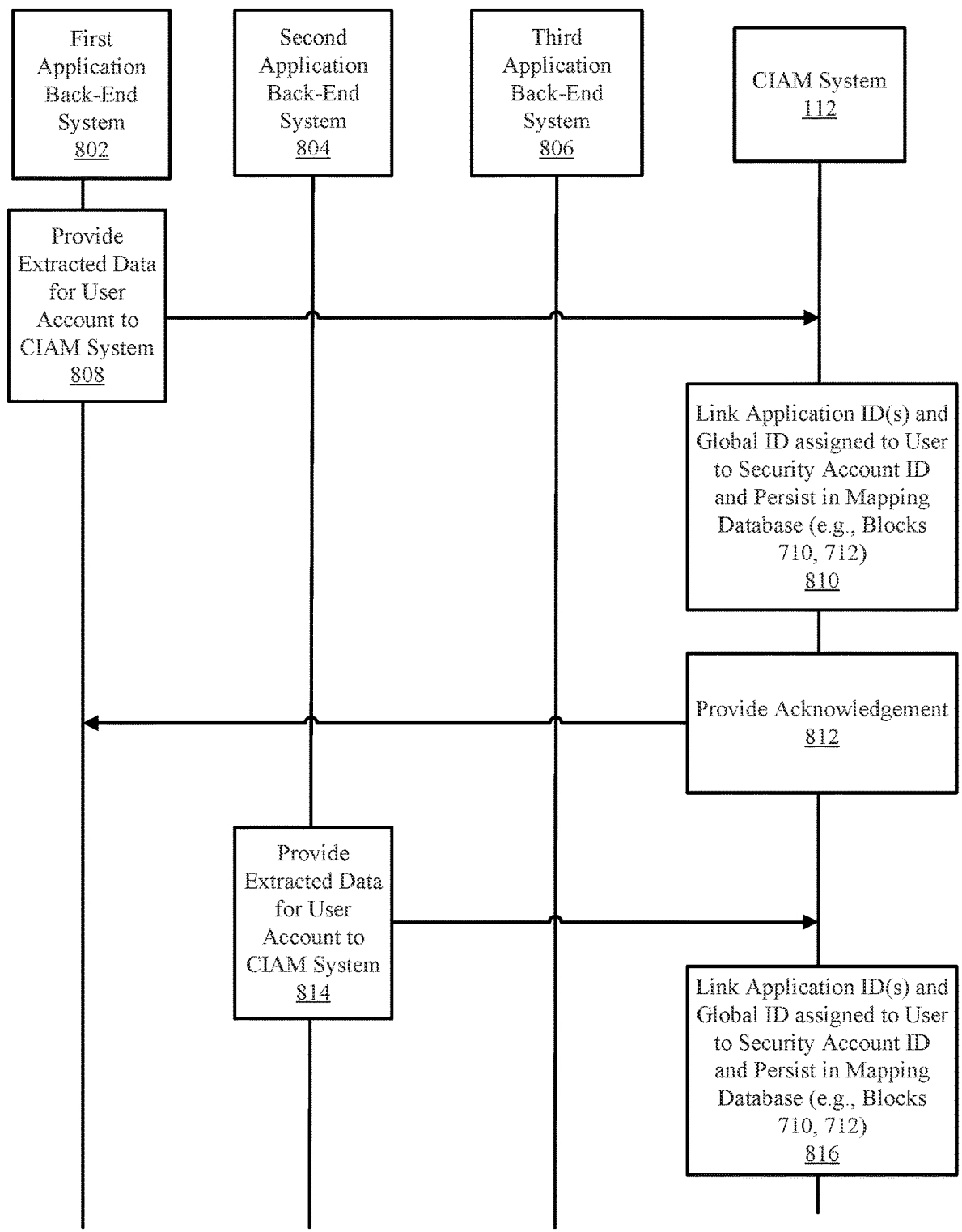
FIGS. 8A and 8B show yet another exemplary event sequence for generating the relational data structures in accordance with one or more examples of the present application.
Figure 8A:
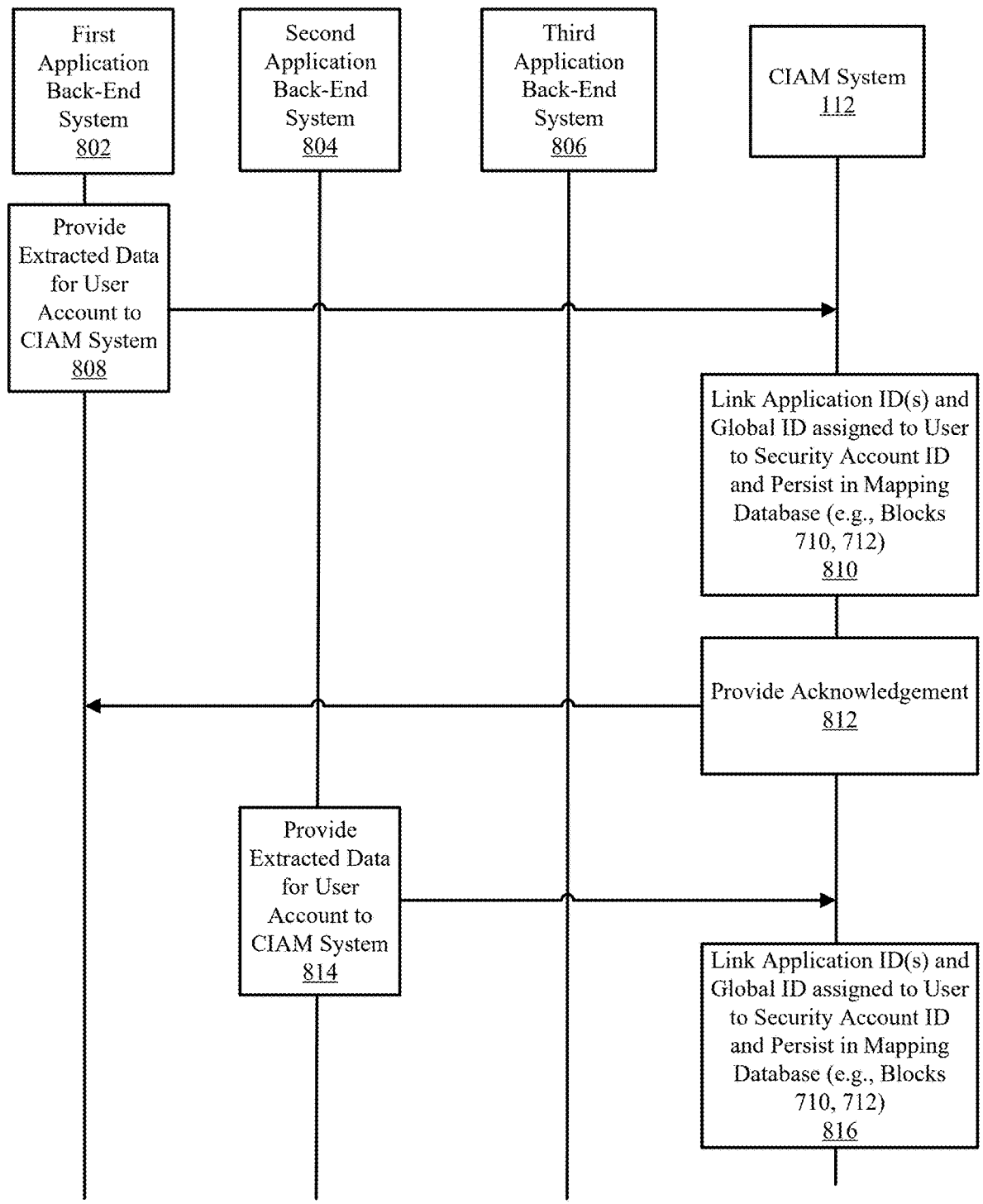
Figure 8B:
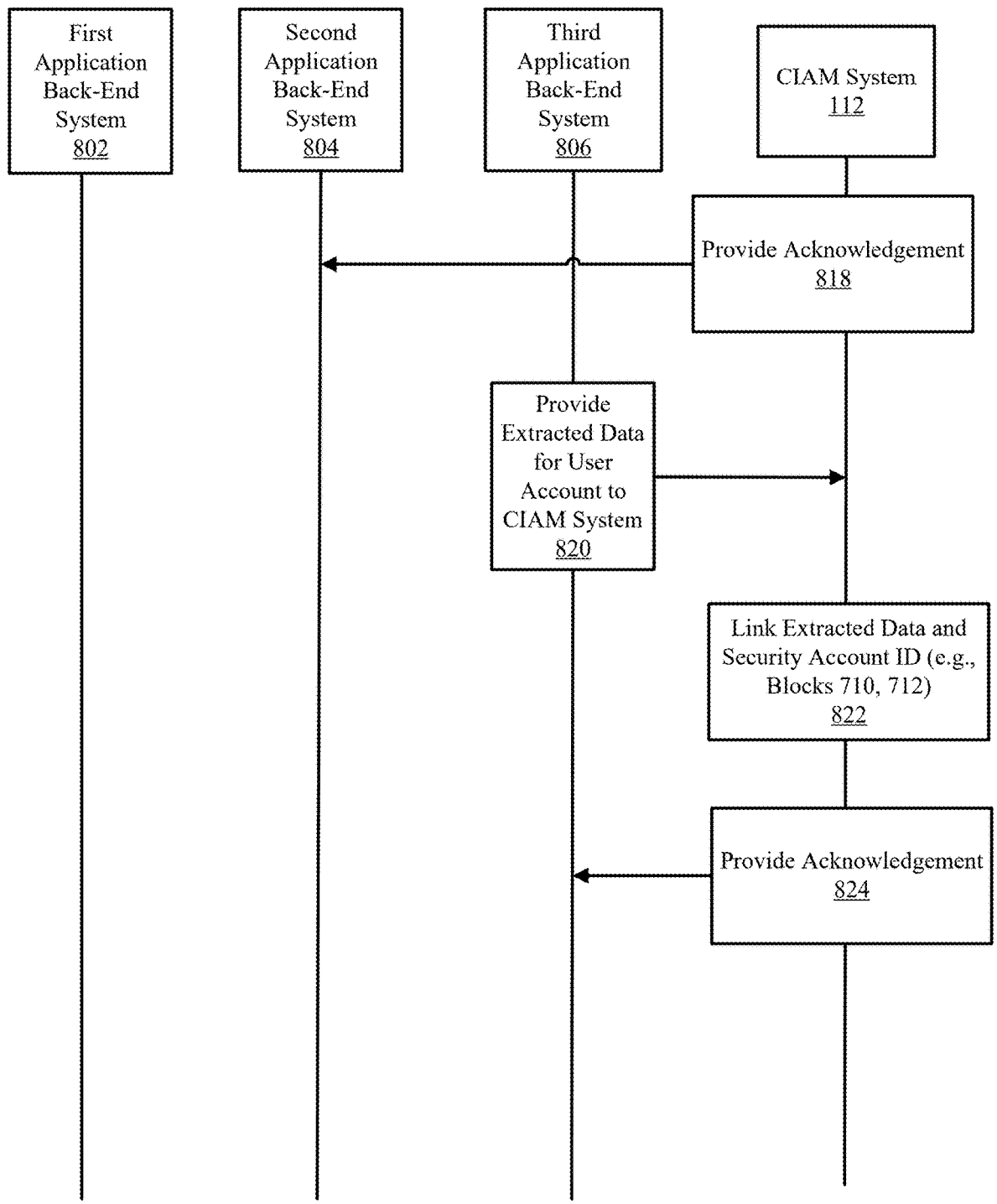

FIGS. 7, 8A, and 8B show exemplary event sequences 700 and 800 for generating the relational data structures using the bulk ingestion service when bulk importing a plurality of users from one or more legacy IDPs 118 (e.g., the legacy IDP 706 shown in FIG. 7). The event sequence 700 includes processes, functions, and/or steps performed by the data extractor system 702, the application back-end system 704, the legacy IDP 706, the CIAM system 112, and the matching system 116. For instance, the data extractor system 702 may be included in and/or may be the bulk ingestion service 312. In other examples, the data extract system 702 is a separate computing system from the CIAM system 112 and/or the application back-end systems. Event sequence 700 may be used to take an account from an existing legacy IDP 706, and include it into a new CIAM 112 system along with associated application identifiers. For example, the enterprise organization may acquire and/or merge with another enterprise organization that manages and/or operates one or more legacy IDPs (e.g., the legacy IDP 706) as well as one or more applications. Each of these applications may include a list of users that have been previously registered to use the service provided by the application. After the acquisition and/or merger, the enterprise organization may seek to ingest, generate, and/or update the relational data structure to include the list of users for these applications.

For instance, at block 708, the data extractor system 702 extracts data for a user application account. For example, the data extractor system 702 may obtain a list of users from the application back-end system 704. The list of users may comprise information indicating the application identifiers for the users that the application back-end system 704 knows the users by. For instance, the application back-end system 704 may generate and/or store, in the application account database 110, the application identifiers for the users, user information associated with the users such as usernames, passwords, and/or other information for the users, and/or claims, permissions, and/or entitlements for the users). As such, at block 708, the data extractor system 702 extracts the data from the application back-end system 704.

Additionally, and/or alternatively, the data extractor system 702 may obtain global IDs for the users from the matching system 116. For example, the data extractor system 702 may call an API provided by the matching system 116 to look up users based on user-specific data, such as demographic data, and provide this data to the bulk ingestion service 312 if available.

At block 710, the data extractor system 702 obtains the security account information for user 102 from the legacy IDP 706. The security account from the legacy IDP 706 may indicate how the user 102 previously accessed the application (e.g., what the user 102 used previously to log in and access the application). This may be migrated to the CIAM 112. For example, this information is added to the information collected at block 708.

At block 712, the data extractor system 702 provides the extracted data (e.g., the security and application accounts for the user 102) to the CIAM system 112 (e.g., the bulk ingestion service 312). For example, the extracted data may indicate the application identifiers for the list of users as well as their associated global IDs from the matching system 116, if available. The extracted data may further indicate the security account information from the legacy IDP 706. The data extractor system 702 may provide this extracted data to the CIAM system 112, which allows for the CIAM system 112 to authenticate the user 102 and authorize the user 102 for an application.

At block 714, the CIAM system 112 creates a security account and an associated security account ID. For example, the CIAM system 112 (e.g., the bulk ingestion service 312) obtains the extracted data, including the application identifiers, the security account information, and its associated global IDs. The CIAM system 112 may generate security account IDs for the application identifiers and/or its associated global IDs. For instance, the bulk ingestion service 312 may provide information to the identity provider 302 such that the identity provider 302 may create the security account (e.g., username and password) and an associated security account ID, and store the created security account ID in a security account database 114.

At block 716, the CIAM system 112 links the application ID(s) and the global ID assigned to the user to the security account ID and persist in mapping database 310. For example, the bulk ingestion service 312 may store an entry indicating the created security account ID, the application ID, and the global ID into the relational data structure stored in the mapping database 310. For example, referring to FIG. 5A, the CIAM system 112 may populate one or more entries for each user, within the list of users of the extracted data. Each entry may indicate the global ID and the application ID from the extracted data as well as the created security account ID from block 710. For instance, the CIAM system 112 may populate the first entry for the user (e.g., user 102) with the global ID of "244", the application ID of "55", and the security account ID of "169".

At block 718, the CIAM system 112 provides acknowledgement of the processing result for the user account. For instance, the CIAM system 112 may provide an acknowledgement of the processing result indicating that the list of users was processed (e.g., ingested) by the CIAM system 112 and stored in the security account database 114 and/or the mapping database 310.

In some examples, the extracted data from the data extractor system 702 might not include the global ID. As such, the CIAM system 112 may provide a request to the matching system 116, and the request may indicate user information from the extracted data. Based on the request, the matching system 116 may determine the global IDs, and provide the global IDs to the CIAM system 112 in an asynchronous or synchronous manner.

Referring to FIGS. 8A and 8B, the event sequence 800 includes processes, functions, and/or steps performed by the first through third application back-end systems 802, 804, and 806 as well as the CIAM system 112. As mentioned previously, in some examples, the data extractor system 702 is part of the CIAM system 112 and/or part of the application back-end systems. In the event sequence 800, the functionalities of the data extractor system 702 may be part of the first through third application back-end systems 802, 804, and 806. However, certain blocks of the event sequence 800 may be performed by a data extractor system 702 that is separate from the CIAM system 112 and/or separate from the application back-end systems 802, 804, and 806. The event sequence 800 is similar to the event sequence 700 except event sequence 800 describes bulk ingesting of data from a plurality of different application back-end systems (e.g., systems 802-806) and/or legacy identity provider(s).

For example, at block 808, the first application back-end system 802 provides extracted data for the user account to the CIAM system. As mentioned previously, the extracted data may include and/or indicate the application identifiers for a list of users for a first application associated with the first application back-end system 802. Further, the extracted data may include and/or indicate the associated global IDs from the matching system 116. Additionally, and/or alternatively, the extracted data may include the application accounts for the user 102 and/or the security account information from the legacy identity providers that is described above in FIG. 7.

At block 810, the CIAM system 112 may link the application ID(s) and the global ID assigned to the user to the security account ID and persist in the mapping database 310. For example, as described above in blocks 710 and 712, the CIAM system 112 may create security account IDs for the users from the list of users and link the application IDs, global IDs, to the created security account IDs. The CIAM system 112 may further persist these identifiers in the relational data structure in the mapping database 310. For example, referring to FIG. 5A, the CIAM system 112 may populate the first entry for the user 102 such as by persisting the global ID "244", application ID "55", and security account ID "169" for the first application associated with the first application back-end system 802.

At block 812, the CIAM system 112 may provide an acknowledgement to the first application back-end system 802. For instance, the CIAM system 112 may provide an acknowledgement of the processing result indicating that the list of users was processed (e.g., ingested) by the CIAM system 112 and stored in the security account database 114 and/or the mapping database 310.

At block 814, similar to block 808, the second application back-end system 804 provides extracted data for the user account to the CIAM system 112. The second application back-end system 804 may be associated with a second application that is different from the first application. At block 816 and similar to block 810, the CIAM system 112 links the application IDs and the global ID assigned to the user to the security account ID, and persists in the mapping database. Referring to FIG. 8B, at block 818, the CIAM system 112 provides an acknowledgement to the second application back-end system 804.

Then, for a third application that is different from the first and second applications, at block 820, similar to block 808, the third application back-end system 806 provides extracted data for the user account to the CIAM system 112. At block 822 and similar to block 810, the CIAM system 112 links the application IDs and the global ID assigned to the user to the security account ID, and persists in the mapping database. At block 824, the CIAM system 112 provides an acknowledgement to the third application back-end system 806.

As such, referring to FIG. 5A, using event sequence 800, the CIAM system 112 performs bulk ingestion for three separate applications that are used by the same person, and accessed using three different security accounts. For instance, the CIAM system 112 creates and populates three entries for the three applications and three security accounts. The global IDs for each of the entries is the same as it is for the same user (e.g., user 102), but the application IDs and security IDs are different for the three entries as each application may know the user using a different application ID and accessed using different security accounts associated with the same person.

Returning back to FIG. 4 and after generating the relational data structure (e.g., based on event sequences 600-800), at block 404, based on a request to access resources for a first application from a user device (e.g., the user device 104), the CIAM system 112 provides information indicating a first security account identifier for the first application. For example, the user 102 may seek to access to content on the first application, and provide a request (e.g., login request) to access resources for the first application. The CIAM system 112 may perform a login process and provide signed tokens (e.g., a first signed JWT) to the user device 104. The signed tokens may indicate a first security account identifier for the first application, and the user device 104 may use the first signed token to access resources and/or content for the first application. Furthermore, as will be explained below in blocks 406-414, the first signed tokens (e.g., the first security account identifier) may be used by the user 102, the user device 104, and the CIAM system 112 for SSO (e.g., for a second application, a third application, and so on).

Figure 9B:
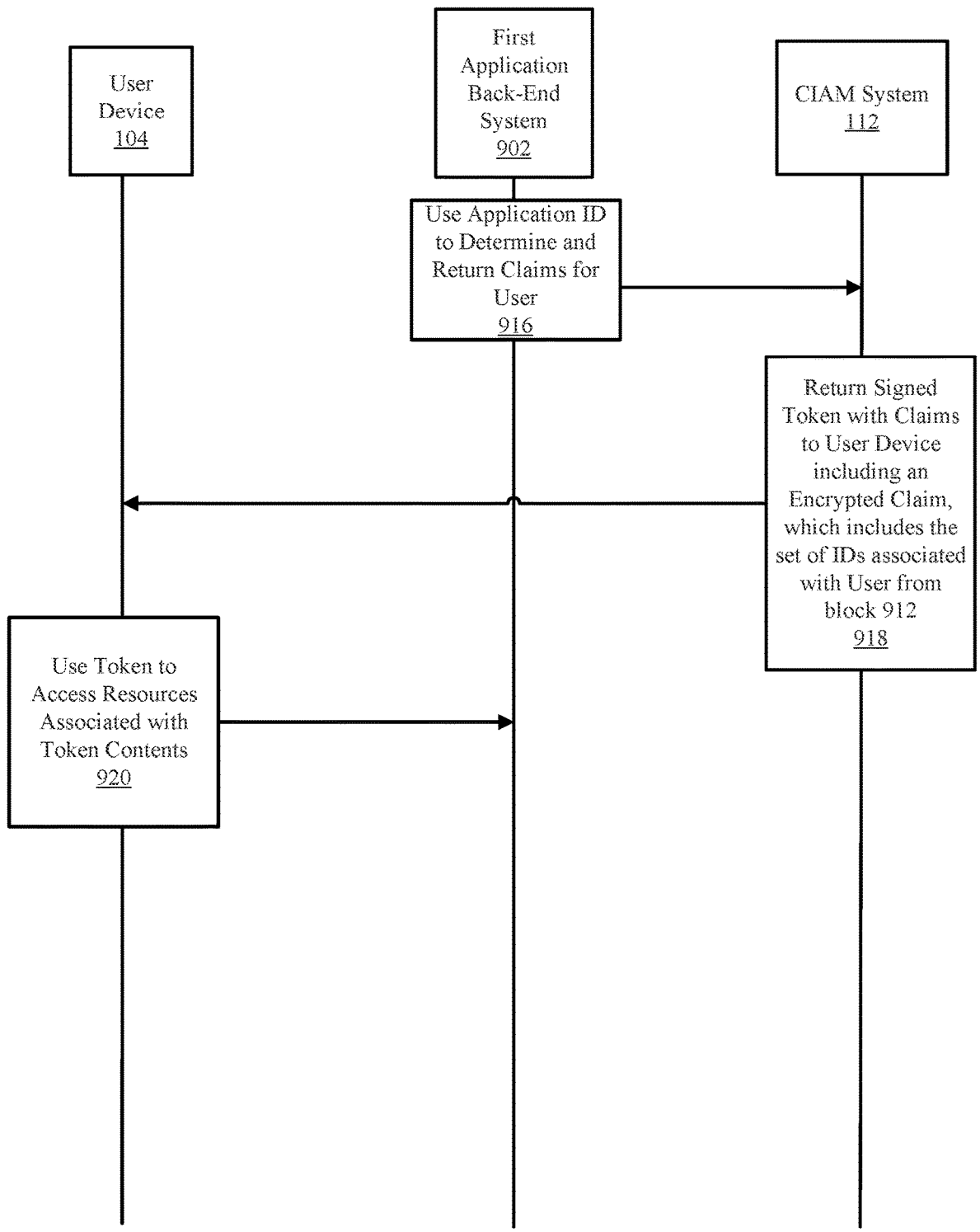

Block 404 will be described in further detail in the context of event sequence 900. FIGS. 9A and 9B show an exemplary event sequence 900 for login and token enrichment using the customer identity and access management system in accordance with one or more examples of the present application. The event sequence 900 includes processes, functions, and/or steps performed by the user device 104, the first application back-end system 902, and the CIAM system 112.

At block 904, the user device 104 provides, to the CIAM system 112, login information (e.g., username, password, one-time passcode, and/or other information). For example, the user 102 may seek to access content on a first application. Before starting SSO, the user 102 may use the user device 104 to provide login information for the first application. The login information may include the username, password, and/or two-factor authentication information (e.g., a one-time passcode) for the user 102.

At block 906, the CIAM system 112 provides, to the user device 104, a successful login return authentication code ("auth_code"). The authentication code may indicate a standard authorization code grant flow. For instance, based on the login information, the CIAM system 112 may determine whether the user 102 is authenticated. As mentioned previously, the CIAM system 112 may include the identity provider 302 and the security account database 114. Based on the login information, the identity provider 302 may determine whether the user 102 is authenticated. If the user 102 is authenticated, the CIAM system 112 may return the auth_code back to the user device 104.

At block 908, the user device 104 provides, to the CIAM system 112, a request for a token using the auth_code. For example, based on the received auth_code, the user device 104 may provide a token request indicating a request for a token. For instance, as mentioned previously, each user 102 may be entitled to different claims, permissions, and/or entitlements (e.g., standard or premium content and/or a particular type of insurance policy). The user device 104 may provide a token request for a token indicating the different claims, permissions, and/or entitlements, which are stored by the first application back-end system 902. Initially, using the auth_code, the user device 104 provides the token request to the CIAM system 112.

At block 910, the CIAM system 112 uses the auth_code to determine the security account ID for the user. For example, the security account ID may be the security account ID that was generated by the CIAM system 112 in blocks 618 and/or 710 of event sequences 600, 700. Based on the auth_code, the CIAM system 112 may determine the security account identifier for the user (e.g., "169").

At block 912, using the relational data structure (e.g., the identity data structure), the CIAM system 112 determines application IDs and a global ID for user using the security account ID as lookup key. For example, after obtaining the security account identifier, and using the relational data structure, the CIAM system 112 may determine one or more application IDs and a global ID for the security account ID. For instance, referring to FIG. 5A, based on the security account identifier "169", the CIAM system 112 may determine the application ID, "55", for the first application and the global ID, "244", for the user 102.

At block 914, the CIAM system 112 provides the application ID to the first back-end system 902. For instance, after determining the application ID (e.g., "55"), the CIAM system 112 provides the application ID to the first back-end system 902.

Referring to FIG. 9B, at block 916, the first application back-end system 902 uses the application ID to determine and return claims for user to the CIAM system 112. For instance, as mentioned above, during registration and/or enrollment (e.g., block 608), the first application back-end system 902 generates a unique application ID for the user 102 and stores it in the application account database 110 with its associated claims, entitlements, and/or permissions. This same unique application ID is then provided to the CIAM system 112 and stored in the mapping database 310. After obtaining the application ID and providing it to the first application back-end system 902, the first application back-end system 902 may determine the associated claims, entitlements, and/or permissions for the user 102 for the first application. The first application back-end system may return the associated claims for the user 102 for the first application to the CIAM system 112.

At block 918, the CIAM system 112 returns a signed token with the claims to user device 104 including an encrypted claim, which includes the set of IDs associated with user from block 912. For instance, using the returned claims for the user 102, the CIAM system 112 may generate a first signed token (e.g., a first signed JWT) for the first application. The signed token may indicate the claims of the user 102 (e.g., the content that is accessible by the user 102 for the first application) and may further indicate and/or include a set of IDs associated with the user 102 from block 912. For instance, the signed token may further indicate the first application ID (e.g., "55") for the first application, the global ID (e.g., "244"), and/or the security account ID for the first application (e.g., "169"). In some instances, the set of IDs of the signed token may indicate only one ID (e.g., the global ID, the security account ID, or the first application ID). In other instances, the set of IDs may indicate multiple IDs (e.g., the global ID, the security account ID, and/or the first application ID). After generating the first signed token, the CIAM system 112 provides the signed token to the user device 104. In some variations, the CIAM system 112 may encrypt the claim. For example, the CIAM system 112 may use one or more encryption processes, algorithms, and/or methods to encrypt the claims of the user 102 and/or the set of IDs associated with the user 102.

At block 920, the user device 104 uses a token to access resources associated with token contents. For example, the user device 104 may provide the signed token (e.g., the first signed token) to the first application back-end system 902, and the first application back-end system 902 may process the signed token and grant access to content and/or resources indicated by the claims of the signed token.

Returning back to FIG. 4 and block 404, in some examples, the CIAM system 112 may provide information (e.g., the signed token with the encrypted claims as well as the set of IDs) indicating the first security account identifier for the first application to the user device 104. Additionally, and/or alternatively, as described below, the CIAM system 112 may provide other identifiers, such as the global ID, to the user device 104.

At block 406, the CIAM system 112 receives, from the user device 104, a request to access resources for a second application. The request may indicate the first security account identifier for the first application. For example, as mentioned above, when requesting access for the first application, the CIAM system 112 may generate a first signed token for the first application, and the first signed token may include one or a plurality of identifiers (e.g., the first security account identifier, a global ID, etc.) associated with user 102. In some examples, as mentioned above, the set of identifiers may include the first security account identifier and/or other identifiers such as the global ID and/or the first application identifier. In some instances, the request may be the first signed token (e.g., the token that was generated as part of block 404 and/or block 918 of event sequence 900). In some variations, the CIAM system 112 may receive one or more identifiers (e.g., the global ID and/or the first security account identifier), and use the one or more identifiers to determine the additional application identifiers and/or security account identifiers associated with the user 102. For example, in some instances, the CIAM system 112 may obtain a global ID (e.g., the first signed token may include the global ID and might not include the first security account identifier). In such instances, the CIAM system 112 may skip block 408 described below (e.g., using the relational data structure and first security account identifier to determine the global ID) as the CIAM system 112 already has obtained the global ID, and proceed directly to block 410. In other instances, the CIAM system 112 may obtain the first security account identifier, and use block 408 to determine the global ID.

At block 408, the CIAM system 112 determines, using the relational data structure (e.g., the relational data structure 500), a global ID associated with the first security account identifier. For example, referring to FIG. 5A, at block 406, the CIAM system 112 may receive a request indicating a first security account identifier for the first application, which may be represented by row 508 of the relational data structure 500. As shown, the first security account identifier for the first application may be "169". Therefore, at block 408 and using the entry 508, the CIAM system 112 may determine the global ID associated with the first security identifier as "244". As mentioned previously, the global ID may be specific to the user 102 (e.g., a user 102 may have multiple different application IDs and/or security account IDs, but only a single global ID from the matching system 116 when the matching system determines that multiple instances of the user 102 are the same person).

At block 410, the CIAM system 112 determines, using the relational data structure, one or more additional application identifiers and security account identifiers based on the identifiers sharing the same global ID. For example, referring to FIG. 5A, after determining the global ID for the user 102 as well as for the first security identifier is "244", the CIAM system 112 determines other security account identifiers and/or application identifiers associated with this global ID. For example, the CIAM system 112 may determine that the same global ID, "244", is included for the second and third entries 510 and 512. Therefore, the CIAM system 112 may determine the application identifiers "99" and "89" as well as the security account identifiers "555" and "906" from these entries 510 and 512.

At block 412, based on providing the one or more additional application identifiers to a second application back-end system, the CIAM system 112 generates a second set of signed tokens comprising application entitlements indicating permissions that the single user 102 is entitled to for the second application. For example, as mentioned previously, while the second application back-end system might not "know" the global ID of the user 102 (e.g., "244"), the security account identifiers of the user 102 (e.g., "169", "555" or "906"), or the first or third application identifiers (e.g., "55" or "89"), when registering/enrolling the user 102, the second application back-end system may have generated the second application identifier (e.g., "99") and stored it in the application account database 110 along with information indicating the claims, permissions, and/or entitlements for the user 102 for the second application. As such, based on the CIAM system 112 providing the one or more additional application identifiers to the second application back-end system (e.g., the application identifiers "99" and/or "89"), the second application back-end system may "know" the user 102. For instance, the second application back-end system may compare the application identifiers (e.g., "99") with the stored application identifiers, and determine that the application identifier (e.g., "99") matches with the user 102. Based on this matching, the second application back-end system may retrieve claims, permissions, and/or entitlements for the user 102 for the second application. The second application back-end system may provide the retrieved claims, permissions, and/or entitlements for the user 102 to the CIAM system 112. The CIAM system 112 may generate a second set of signed tokens comprising application entitlements indicating permissions that the single user 102 is entitled to for the second application.

At block 414, the CIAM system 112 generates a signed token (e.g., a signed JWT) based on the second application entitlements. For example, the CIAM system 112 may generate a second signed token that is different from the first signed token for the first application, and the second signed token indicates the second application entitlements for the user 102.

For instance, the claims in the token may indicate the entitlements for the user (e.g., user 102). By using process 400, the CIAM system 112 may obtain a token request for a second application, lookup the second application identifier associated with the user 102 in the relational data structure (e.g., block 410, which may include one or more queries to obtain the second application identifier), call the second application backend system with the user's second application identifier and ask the application backend system to provide claims for the token representing the user's entitlement (e.g., block 412), and construct the token, sign it, and send it to the user device 104 (e.g., block 414). In other words, the entitlements may be application specific. For instance, the first application may include features A, B, and C, and each feature may be accessed based on the user's subscription. For instance, a first user may subscribe to features A and B, and a second user may subscribe to features A and C. The entitlement, represented as a claim in the JWT for example, may indicate the subscription (e.g., features A and B for the first user and features A and C for the second user). For a second application, the subscription levels may include X, Y, and Z, which indicate different levels of service. The first user may subscribe to X for the second application, and the second user may subscribe to Z for the second application. Similarly, when requesting the claims, the JWT for the second application may indicate X for the first user and Z for the second user.

At block 416, the CIAM system 112 provides, to the user device 104, the generated signed token. The signed token is used by the user device 104 to access resources on the second application back-end system.

Figure 10A:
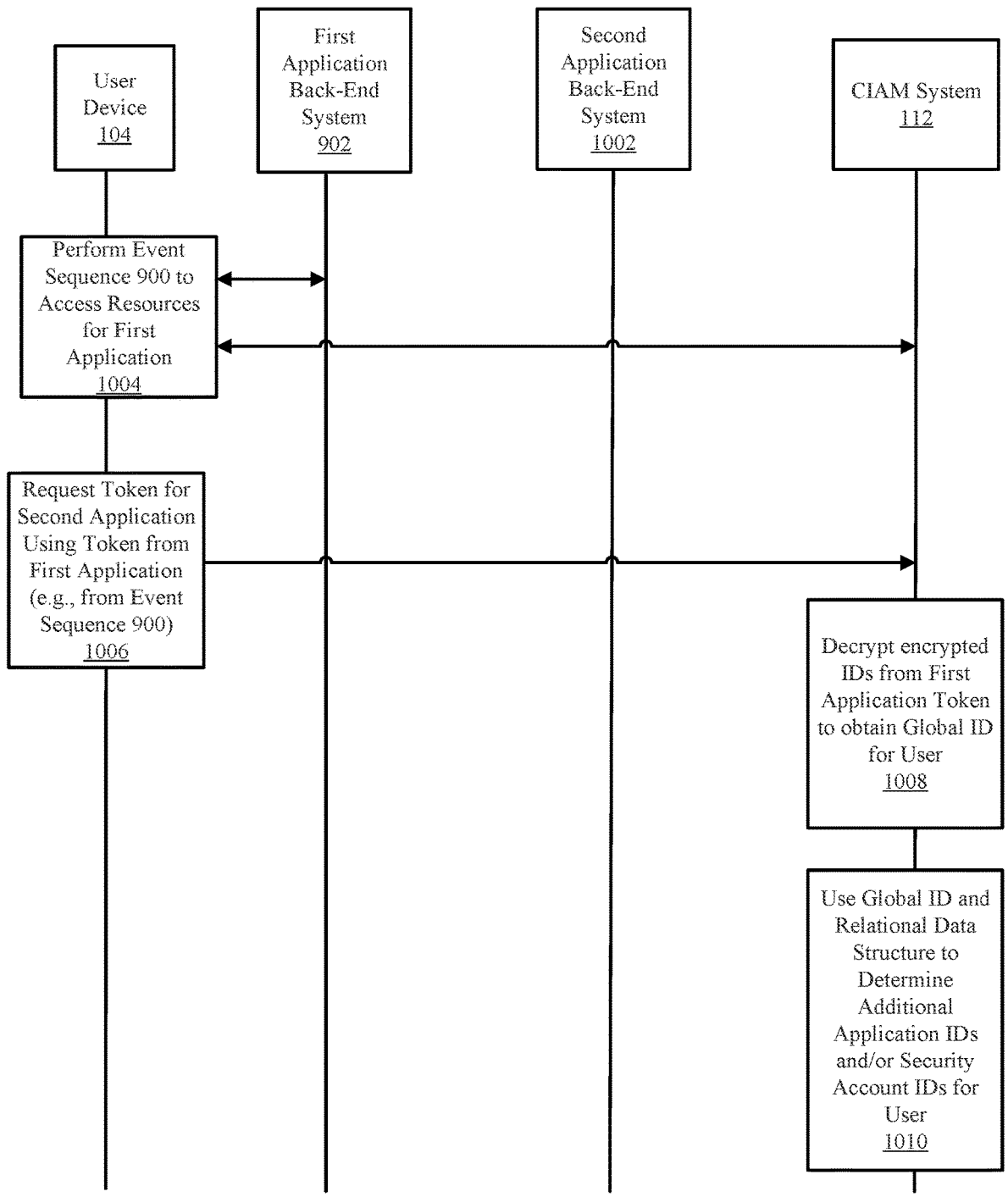
FIGS. 10A and 10B show an exemplary event sequence for single sign-on (SSO) using the customer identity and access management system in accordance with one or more examples of the present application.
Figure 10B:
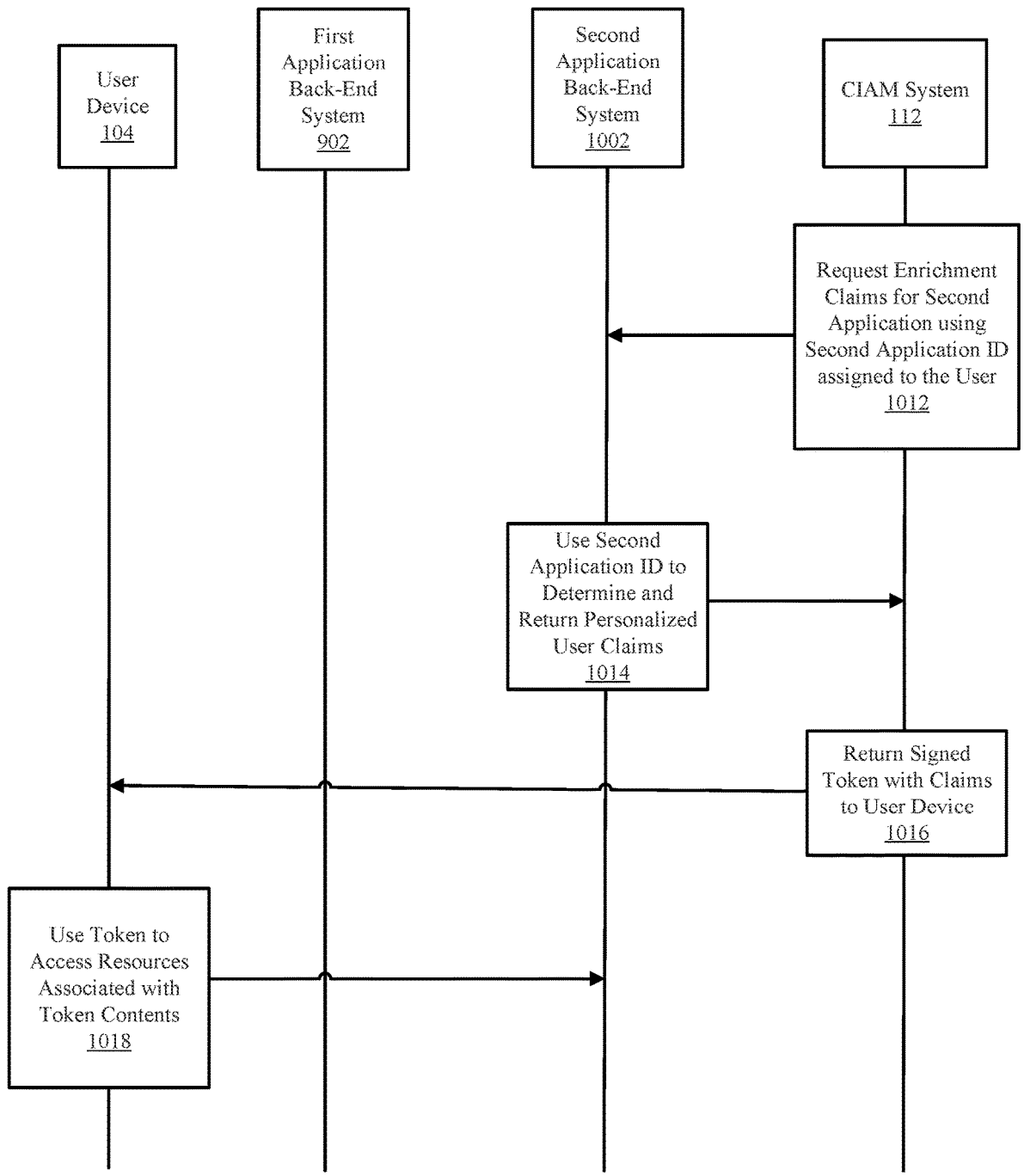
Figure 11:
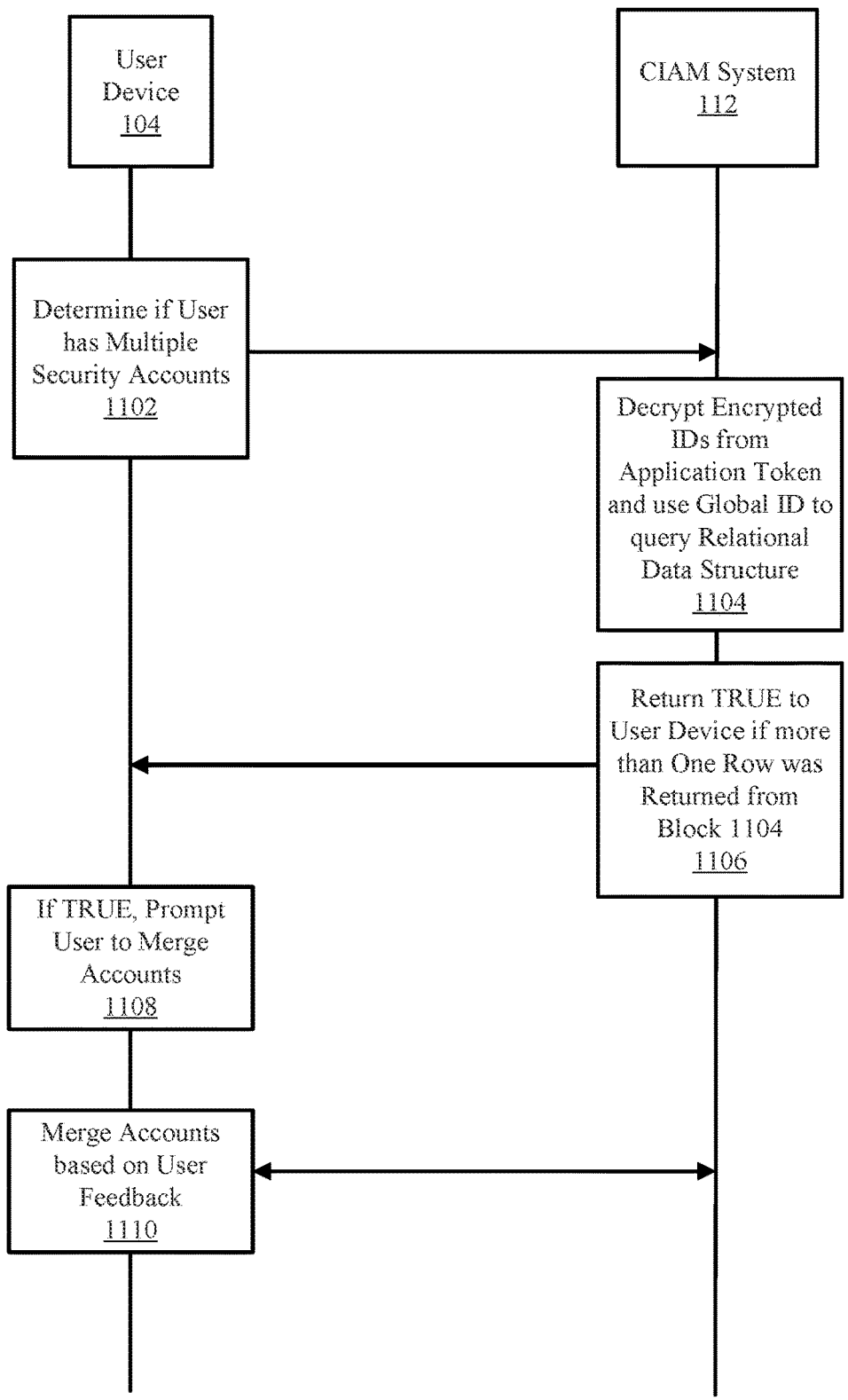
FIG. 11 shows an exemplary event sequence for merging multiple accounts in accordance with one or more examples of the present application.

Blocks 406-416 will be described in further detail in the context of event sequence 1000 of FIGS. 10A and 10B. FIGS. 10A and 10B show an exemplary event sequence for single sign-on (SSO) using the customer identity and access management system in accordance with one or more examples of the present application. The event sequence 1000 includes processes, functions, and/or steps performed by the user device 104, the first application back-end system 902, a second application back-end system 1002, and the CIAM system 112.

At block 1004, the user device 104 performs event sequence 900 (e.g., shown in FIGS. 9A and 9B) to access resources for the first application. As mentioned above, the user device 104 may obtain a first signed token (e.g., a first JWT) that is used to access resources for the first application, the first signed token may indicate one or a plurality of identifiers such as the first security account identifier for the first application and/or a global ID for the user 102.

At block 1006, the user device 104 requests a token for a second application using the token from the first application (e.g., the token from the event sequence 900). For instance, as mentioned above in block 406, the request may indicate and/or include the first signed token for the first application, which may include a set of IDs such as the first security account identifier. The first signed token, including the set of IDs, may be encrypted, if it is necessary to keep the IDs confidential.

At block 1008, the CIAM system 112 decrypts the encrypted IDs (if the IDs were previously encrypted) from the first application token (e.g., the first signed token or first JWT) to obtain one or a plurality of IDs associated with the user 102. For example, as mentioned above, the encrypted IDs from the first signed token may include the first security account identifier, a global ID, and/or the first application ID. The CIAM system 112 may decrypt the encrypted IDs to obtain the first security account identifier, and use the relational data structure and the first security account identifier to obtain the global ID for the user 102. In some instances, the first signed token may include an encrypted version of the identifiers. As such, at block 1008, the CIAM system 112 may simply decrypt the encrypted IDs to obtain the identifiers.

At block 1010, the CIAM system 112 uses the global ID, security account ID, and/or first application ID and relational data structure to determine additional IDs associated with user 102. For example, as mentioned above in block 408 and 410, the CIAM system 112 may use the global ID to determine additional application IDs (e.g., "99" and "89" from FIG. 5A) and security account IDs (e.g., "555" and "906" from FIG. 5A) based on the global ID (e.g., "244").

At block 1012, the CIAM system 112 requests enrichment of claims for second application using second application ID (e.g., "99") assigned to the user 102. For example, as described above in block 412, the CIAM system 112 may provide a request to the second application back-end system 1002. The request may be for enrichment of claims for the second application, and may include the second application ID (e.g., "99").

At block 1014, the second application back-end system 1002 uses the second application ID (e.g., "99") to determine and return personalized user claims to the CIAM system 112.

At block 1016, the CIAM system 112 generates and returns a signed token (e.g., a second signed token or a second JWT) with the claims representing the entitlements for the second application to the user device 104.

At block 1018, the user device 104 uses the signed token (e.g., the second signed token or the second JWT) to access resources associated with the token contents. For instance, the user device 104 may communicate with the second application back-end system 1002 to access the resources associated with the token contents.

The event sequence 1000 may repeat for additional applications as well. For instance, the user device 104 may seek to access content on a third, fourth, fifth, and/or other applications that have their own associated application back-end systems 108. For each application, the user device 104 may provide a request for a token for the application (e.g., the third application) using the token from the first application, which includes one or a plurality of IDs for the user 102. Then, using the one of the IDs (e.g., global ID and/or first security account identifier), the CIAM system 112 may use the relational data structure to determine additional application IDs (e.g., "89" as the application ID for the third application, which is shown in relational data structure 500) and/or security IDs for the user 102. After, using the additional application IDs, such as the third application ID "89", the CIAM system 112 may request enrichment claims for the third application using the third application ID. The CIAM system 112 may then obtain the personalized user claims from a third application back-end system, and generate a signed token (e.g., a third signed token) with claims for the user 102 for the third application. The CIAM system 112 may return the signed token to the user device 104 and the user device 104 may use the third signed token to access resources associated with the token contents for the third application.

Additionally, and/or alternatively, either before, during, and/or after performing process 400 and/or the event sequences 600-1000, the CIAM system 112 may perform a merge service, which provides the user 102 the option to merge a plurality of security accounts migrated to the CIAM system 112 belonging to the same person as identified by the matching system 116. For example, after performing block 404 and/or event sequence 900, the user device 104 may obtain a signed token (e.g., a first signed token) for the first application. After performing process 400 and/or event sequence 1000, the user device 104 may obtain a signed token for the second application.

At block 1102, the user device 104 determines if the user 102 has multiple security accounts. For instance, the user device 104 may provide a signed token (e.g., the first and/or second signed tokens) to the CIAM system 112 with a request for the CIAM system 112 to determine whether the user 102 has multiple security accounts and/or multiple entries within the relational data structure in the mapping database 310.

At block 1104, the CIAM system 112 decrypts the encrypted IDs from the application token (e.g., the first and/or second signed tokens) and uses the IDs to query the relational data structure. For instance, as mentioned above, the first and/or second signed tokens may include a security account identifier. The CIAM system 112 may query the relational data structure to obtain the global ID using the security account identifier. The CIAM system 112 may then use the global ID to query the relational data structure to determine whether the user 102 (e.g., the global ID) is associated with more than one entry (e.g., associated with multiple different application identifiers and/or security account identifiers). In some instances, the first and/or second signed tokens may include or indicate the global ID (e.g., an encrypted global ID). The CIAM system 112 may decrypt the encrypted IDs to determine the global ID, and use the global ID to query the relational data structure to determine whether the user 102 (e.g., the global ID) is associated with more than one entry (e.g., associated with multiple different security account identifiers used by the same person).

At block 1106, the CIAM system 112 may return TRUE to the user device 104 if more than one row was returned from block 1104, indicating that the user 102 has multiple security accounts that were migrated to the CIAM system 112. For example, referring to FIG. 5A, the CIAM system 112 may determine the global ID for the user is "244" at block 1104, and query the relational data structure 500 to determine that the user 102 has three entries 508, 510, and 512 with three different security account IDs of "169", "555", and "906". As such, the CIAM system 112 may return TRUE to the user device 104 because more than one row (e.g., one entry) was returned from block 1104.

At block 1108, if TRUE, the user device 104 prompts the user to merge accounts. For instance, the user device 104 may cause display of a screen requesting user input from the user 102 as to whether the user 102 would like to merge accounts.

At block 1110, based on the user feedback, the user device 104 may prompt the CIAM system 112 to merge accounts. For instance, the user input may indicate to merge accounts. The user device 104 may provide information to the CIAM system 112 indicating for the CIAM system 112 to merge accounts. As such, based on the provided information, the CIAM system 112 may merge the accounts for the user 102. For instance, referring to FIGS. 5A and 5B, the CIAM system 112 may collapse or combine the relational data structure 500 to the relational data structure 550 based on the user indication. For example, as shown in relational data structure 550, the CIAM system 112 uses only one security account ID, "169", for the user 102 and removes the other two security account IDs (e.g., "555" and "906"). Furthermore, the entry 508 includes the same global ID for the user 102, "244", and all three application IDs (e.g., "55", "99", and "89") for the first through third applications. Therefore, by using the merge service, the relational data structure may reduce the number of entries for the users. In the next iteration of process 400 and/or event sequences 900 and/or 1000, the user device 104 and/or the CIAM system 112 may use the updated relational data structure with the reduced number of entries for the users to obtain the application IDs, and determine the claims, permissions, and/or entitlements for the user 102 based on the application IDs.

In other words, in some variations, for the merge service, the CIAM system 112 may receive a log-in request from a user 102 (e.g., via a user device 104). The CIAM system 112 may log the user 102 into the system. The user device 104 may call the CIAM system 112 to ask whether there are one or more security accounts associated with the user 102. The CIAM system 112 may determine whether there are more than one security account associated with the user 102 based on analyzing the relational data structure (e.g., finding rows in the relational data structure that share the same global ID). Based on the CIAM system 112 determining that there is more than one security account associated with the user 102, the CIAM system 112 may provide a prompt to the user device 104. The prompt may provide an option to the user 102 of whether to merge the security accounts. Based on the CIAM system 112 determining that there is only one security account, the CIAM system 112 may provide a prompt indicating that there is nothing to merge.

Based on the user 102 confirming the merging, the CIAM system 112 may collapse the rows of the relational data structure into one or more rows. For example, based on a person having four security accounts, there may be four rows within the relational data structure for the person. After log-in, the user device 104 may call the CIAM system 112, and the CIAM system 112 may provide a prompt indicating that the person has four security accounts, and whether to merge all or some of the security accounts. At this time, the user 102 (via the user device 104) may indicate whether to elect to merge all of the security accounts into one, merge one or more of the security accounts (e.g., two security accounts) into one security account, or do nothing and leave all four accounts. Based on the input from the user device 104, the CIAM system 112 may execute the merge service.

Previously described is a merge workflow requiring user 102 input and consent to merge security accounts migrated to CIAM system 112 from legacy identity providers. An alternate implementation can be fully automated, where the CIAM system 112 systematically walks through all migrated security accounts and automatically merges security accounts sharing the same global ID with no user 102 consent. Both methods result in user 102 with a single security account used to access all applications user 102 is entitled to consume.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method, comprising:
receiving, by a customer identity and access management (CIAM) system and from a user device associated with a first user, a request to access resources for a second application, wherein the request indicates an identifier for a first application that was previously provided to the user device to access resources for the first application;
determining, by the CIAM system, using a relational data structure, and based on the identifier for the first application, one or more application identifiers and one or more security account identifiers associated with the first user, wherein the relational data structure comprises a plurality of entries associated with a plurality of users, wherein each of the plurality of entries is associated with a single user and comprises one or more application identifiers, a security account identifier, and a global identifier (ID);
based on providing the one or more application identifiers associated with the first user to a second application back-end system, generating, by the CIAM system, a signed token indicating permissions that the first user is entitled to for the second application; and
providing, by the CIAM and to the user device, the signed token, wherein the signed token is used by the user device to access the resources associated with the second application back-end system.

2. The method of claim 1, further comprising:
providing, by the CIAM system, a first signed token to the user device, wherein the first signed token is used by the user device to access the resources for the first application and comprises the identifier for the first application, and wherein the identifier for the first application is the global ID for the first user.

3. A method, comprising:
receiving, by a customer identity and access management (CIAM) system and from a user device associated with a first user, a request to access resources for a second application, wherein the request indicates a first security account identifier for a first application that was previously provided to the user device to access resources for the first application;
determining, by the CIAM system and using a relational data structure, a global identifier (ID) associated with the first security account identifier, wherein the relational data structure comprises a plurality of entries associated with a plurality of users, and wherein each of the plurality of entries is associated with a single user and comprises one or more application identifiers, a security account identifier, and a global ID;
determining, by the CIAM system and using the relational data structure, one or more additional application identifiers and one or more security account identifiers for the first user based on the global ID;
based on providing the one or more additional application identifiers for the first user to a second application back-end system, generating, by the CIAM system, a signed token indicating permissions that the first user is entitled to for the second application; and
providing, by the CIAM and to the user device, the signed token, wherein the signed token is used by the user device to access the resources associated with the second application back-end system.

4. The method of claim 3, further comprising:
generating the relational data structure for the plurality of users; and
storing the relational data structure in a database.

5. The method of claim 4, wherein generating the relational data structure comprises:
based on a registration request to register the first user with the second application back-end system, receiving, from the second application back-end system, the one or more additional application identifiers for the first user;
determining the global ID for the first user;
generating a second security account identifier for the first user; and
persisting and storing the one or more additional application identifiers, the global ID, and the second security account identifier into the relational data structure.

6. The method of claim 4, wherein generating the relational data structure comprises:
receiving, from a first data extractor associated with a first application back-end system, a first data file comprising a list of users, wherein each user within the list of users is assigned a unique global ID and a unique first application identifier;
based on receiving the first data file, generating a plurality of security account identifiers for each of the users in the list of users, wherein the plurality of security account identifiers comprises the first security account identifier; and
persisting and storing the first application identifier, the global ID, and the security account identifier for each user into the relational data structure.

7. The method of claim 6, wherein generating the relational data structure further comprises:
receiving, from a second data extractor associated with the second application back-end system, a second data file comprising a second list of users, wherein each user within the second list of users is assigned a unique global ID and a unique second application identifier;
based on receiving the second data file, generating a plurality of second security account identifiers for each of the users in the second list of users; and
persisting and storing the second application identifier, the global ID, and the second security account identifier for each user into the relational data structure.

8. The method of claim 7, wherein determining, using the relational data structure, the global ID is based on the global ID being persisted with the first security account identifier, and
wherein determining, using the relational data structure, the one or more additional application identifiers is based on the one or more additional application identifiers being persisted with the same global ID.

9. The method of claim 3, further comprising:
receiving, from the user device, a login request to access the resources for the first application, wherein the login request indicates credentials of the first user; and
based on validating the credentials of the first user, providing, to the user device, the first security account identifier for the first application, wherein the user device accesses the resources for the first application based on the first security account identifier.

10. The method of claim 9, further comprising:
receiving, from the user device, a token request to access the resources for the first application, wherein the token request indicates the first security account identifier associated with the first user;
determining, using the relational data structure, the global ID and a first application identifier based on the first security account identifier;
based on providing the first application identifier to a first application back-end system, generating, by the CIAM system, a first signed token indicating permissions that the first user is entitled to for the first application; and
providing, to the user device, the first signed token, wherein the first signed token is used by the user device to access the resources on the first application back-end system.

11. The method of claim 10, wherein generating the first signed token comprises:
providing the first application identifier to the first application back-end system, wherein the first application back-end system generated the first application identifier;
receiving, from the first application back-end system, claims indicating the permissions that the first user is entitled to for the first application; and
generating the first signed token based on the claims from the first application back-end system.

12. The method of claim 3, wherein generating the signed token comprises:
providing the one or more additional application identifiers to the second application back-end system, wherein the second application back-end system generated the one or more additional application identifiers;
receiving, from the second application back-end system, claims indicating the permissions that the first user is entitled to for the second application; and
generating the signed token based on the claims from the second application back-end system.

13. The method of claim 3, wherein the user device uses the signed token to perform application programming interface (API) calls with the second application back-end system, wherein the first user is a first user security account, and wherein the global ID is assigned to a single person and is associated with multiple different user security accounts attached to the same person.

14. The method of claim 3, further comprising:
receiving, from the user device, a second request to access resources for a third application, wherein the second request indicates the first security account identifier for the first application;
determining, using the relational data structure, the global ID associated with the first security account identifier;
determining, using the relational data structure, a third application identifier based on the global ID;
based on providing the third application identifier to a third application back-end system, generating a second signed token indicating permissions that the first user is entitled to for the third application; and
providing, to the user device, the second signed token, wherein the second signed token is used by the user device to access the resources associated with the third application back-end system.

15. The method of claim 3, further comprising:
receiving, from the user device, a merge request for duplicate user accounts, wherein the merge request indicates the global ID;
retrieving, using the relational data structure, a plurality of application identifiers and a plurality of security account identifiers associated with the same user sharing the same global ID;
providing, to the user device, a prompt indicating whether to merge the plurality of application identifiers and the plurality of security account identifiers; and
based on a response from the user device:
merging the plurality of security account identifiers into a single security account identifier; and
merging the plurality of application identifiers into one or more merged application identifiers.

16. The method of claim 15, wherein the merge request comprises the first security account identifier or the one or more security account identifiers, and wherein the method further comprises:
determining the global ID based on the one or more security account identifiers or the first security account identifier.

17. The method of claim 3, wherein the request comprises a signed token for the first application, wherein the signed token indicates the first security account identifier for the first application.

18. A system, comprising:
a user device associated with a user, wherein the user device comprises:
one or more first processors; and
a first non-transitory computer-readable medium having first processor-executable instructions stored thereon, wherein the first processor-executable instructions, when executed by the one or more first processors, cause the user device to:
in response to providing a first request to access resources for a first application, receive first application information indicating a first security account identifier for the first application; and
provide a second request to access resources for a second application, wherein the second request indicates the first security account identifier for the first application; and
a customer identity and access management (CIAM) system comprising:
one or more second processors; and
a second non-transitory computer-readable medium having second processor-executable instructions stored thereon, wherein the second processor-executable instructions, when executed by the one or more second processors, cause the CIAM system to:
provide the first application information to the user device;
receive the second request to access the resources for the second application from the user device;
determine, using a relational data structure, a global identifier (ID) associated with the first security account identifier, wherein the relational data structure comprises a plurality of entries associated with a plurality of users, wherein each of the plurality of entries is associated with a single user and comprises one or more application identifiers, a security account identifier, and a global ID, wherein the global ID is assigned to the user based on demographic information associated with the user;

determine, using the relational data structure, one or more additional application identifiers based on the user sharing the same global ID across a plurality of identity providers;

in response to providing the one or more additional application identifiers to a second application back-end system, receive, from the second application back-end system, claims indicating permissions that the user is entitled to for the second application;

generate a signed token indicating the permissions from the second application back-end system; and provide the signed token to the user device, wherein the user device is further configured to use the signed token to access the resources on the second application back-end system.

19. The system of claim 18, further comprising:
the plurality of identity providers, wherein the user is associated with a plurality of applications that are accessed using the plurality of identity providers, wherein each of the plurality of identity providers is configured to assign the single user a unique security account identifier, and wherein the plurality of applications comprise at least the first application and the second application.

20. The system of claim 18, further comprising:
the second application back-end system comprising:
one or more third processors; and
a third non-transitory computer-readable medium having third processor-executable instructions stored thereon, wherein the third processor-executable instructions, when executed by the one or more third processors, cause the second application back-end system to:
generate the one or more additional application identifiers during enrollment of the user for the second application;
receive, from the CIAM system, the one or more additional application identifiers;
determine the permissions that the user is entitled to for the second application identified based on the received one or more additional application identifiers that was previously generated by the second application back-end system and assigned to the user;
provide the claims indicating the permissions that the user is entitled to for the second application; and
in response to receiving user device information indicating the signed token, grant access to the resources for the second application to the user device.

* * * * *